United States Patent [19]
Yamamoto et al.

[11] Patent Number: 5,781,296
[45] Date of Patent: Jul. 14, 1998

[54] CLOSED LOOP TYPE FIBER OPTIC GYROSCOPE FOR MEASURING ABSOLUTE ROTATION BY DELTA SERRODYNE WAVE PHASE MODULATION

[75] Inventors: Kanshi Yamamoto; Shinichi Kawada; Takeshi Hojo, all of Kuroiso; Yoshiyuki Okada, Ujite-machi; Isao Masuzawa, Kuroiso, all of Japan

[73] Assignee: Tokimec Inc., Tokyo, Japan

[21] Appl. No.: 686,365

[22] Filed: Jul. 23, 1996

[30] Foreign Application Priority Data

Jul. 28, 1995 [JP] Japan .................. 7-193357
Dec. 8, 1995 [JP] Japan .................. 7-320645

[51] Int. Cl.$^6$ .................................................. G01C 19/64
[52] U.S. Cl. .................................................. 356/350
[58] Field of Search .................................................. 356/350

[56] References Cited

U.S. PATENT DOCUMENTS 4,869,592 9/1989 Bergh .................. 356/350
5,455,676 10/1995 Nishiuna et al. .................. 356/350

*Primary Examiner*—Samuel A. Turner
*Attorney, Agent, or Firm*—Bauer & Schaffer

[57] ABSTRACT

A fiber optic gyro can overcome the defects encountered with conventional fiber optic gyros of phase-modulation method, closed-loop system with serrodyne modulation and digital modulation. A reference phase difference $\Delta\beta$ and a ramp phase difference $\sigma$ are generated in an interference light intensity signal I by use of a triangular waveform, i.e., delta serrodyne waveform signal. The reference phase difference $\Delta\beta$ is changed to constant values $\Delta\beta_A$ and $\Delta\beta_B$ whose absolute values are the same and whose signs are different at every times $T_A$ and $T_B$. A phase x of the interference light intensity signal I becomes equal to $x=\Delta\theta+\sigma+\Delta\beta$. The ramp phase difference $\sigma$ is controlled so as to satisfy $\Delta\theta+\sigma=0$. Accordingly, at the stable point of the control loop, a Sagnac phase difference $\Delta\theta$ is equal to the ramp phase difference $\sigma$. Further, a phase x of the interference light intensity signal I does not contain the Sagnac phase difference $\Delta\theta$, and hence $x=\Delta\beta$. Also, a fiber optic gyro can eliminate a bias, in particular, optically-generated bias. In a fiber optic gyro of phase-modulation method or delta serrodyne system, a phase controller is supplied with a phase control voltage signal $V_S$ of period T and a square wave signal $V_2$ of period T for correcting an optical bias caused by an amplitude modulation generated by the phase control voltage signal $V_S$ in the added form. The square wave signal $V_2$ has a constant magnitude H and is inverted in polarity at points in which the phase control voltage signal $V_S$ is maximized or minimized. The magnitude H and the polarity of the square wave signal $V_2$ are selected such that an optical bias is minimized.

19 Claims, 24 Drawing Sheets

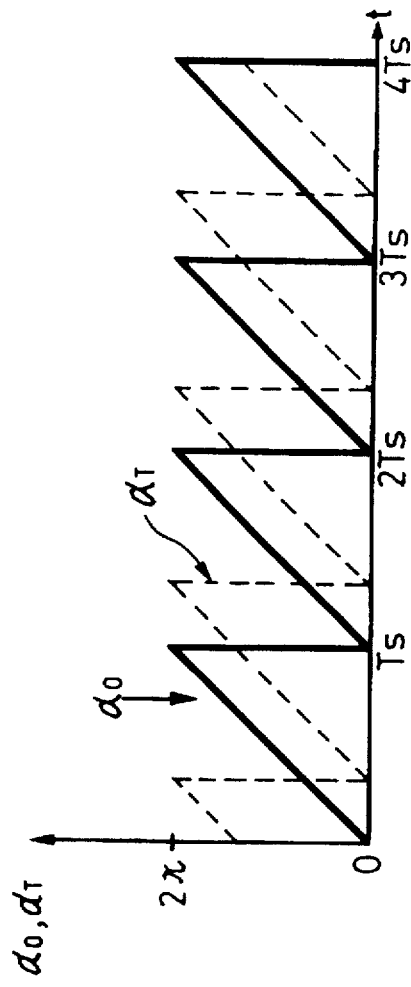
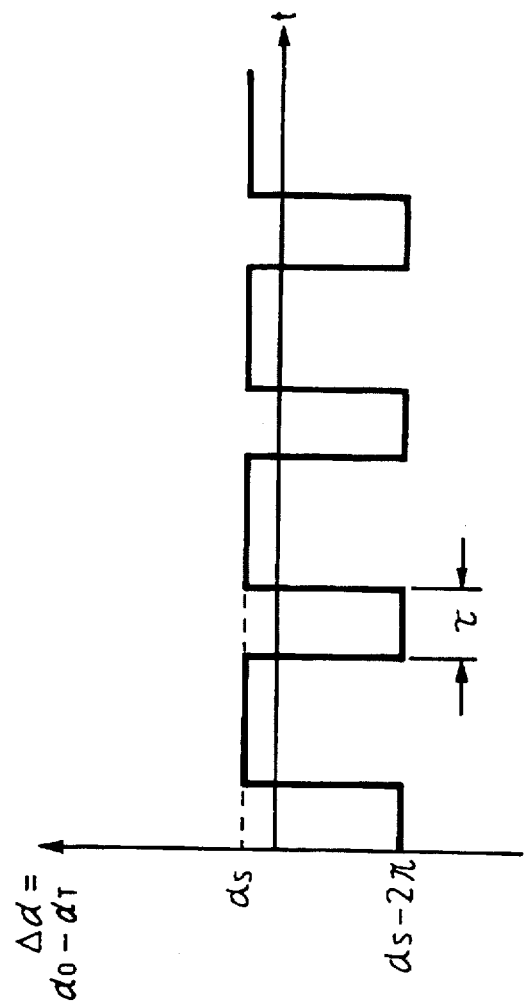
FIG. 3A (PRIOR ART)
FIG. 3B (PRIOR ART)

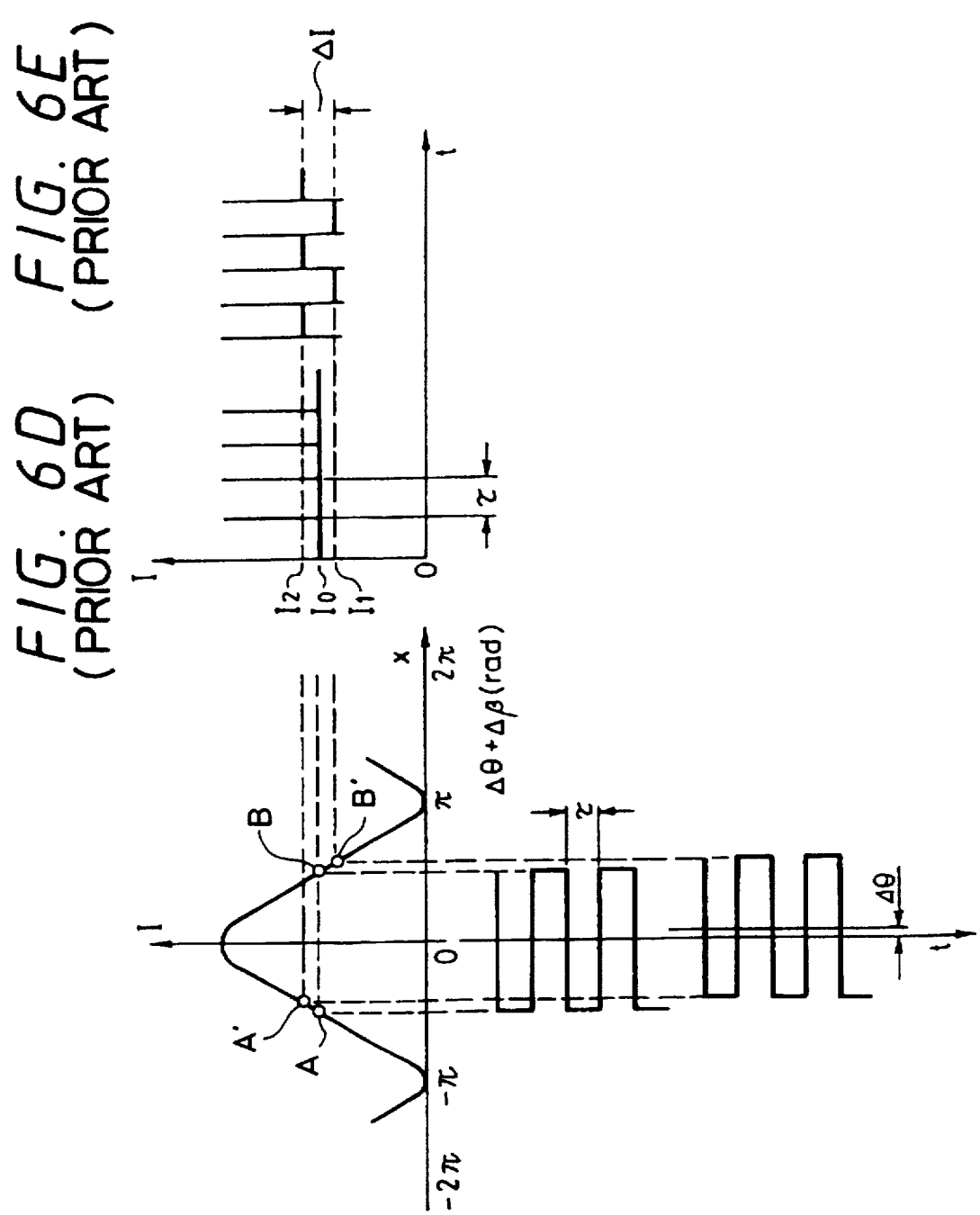

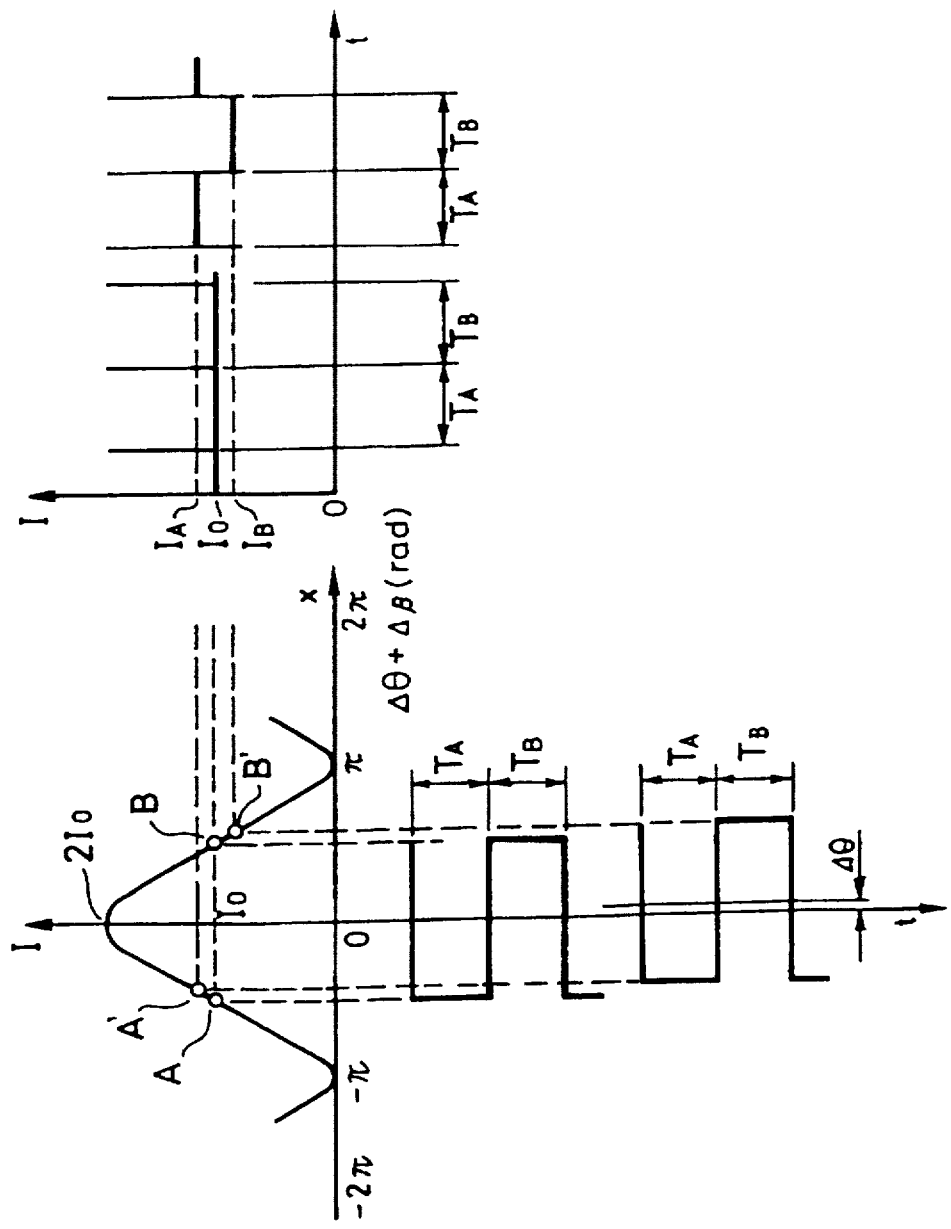

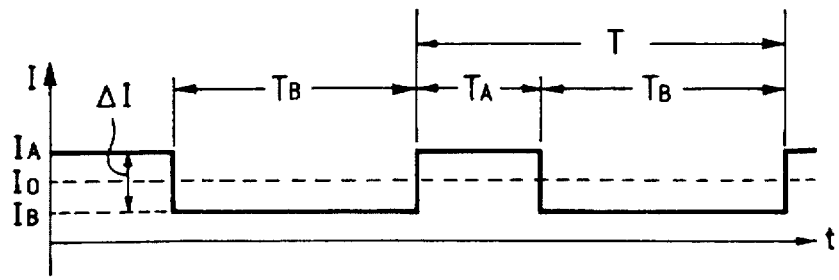
FIG. 9A
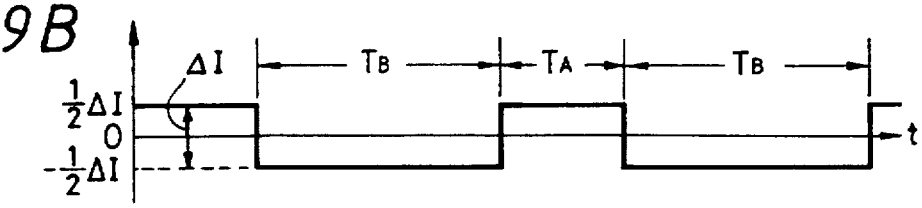
FIG. 9B
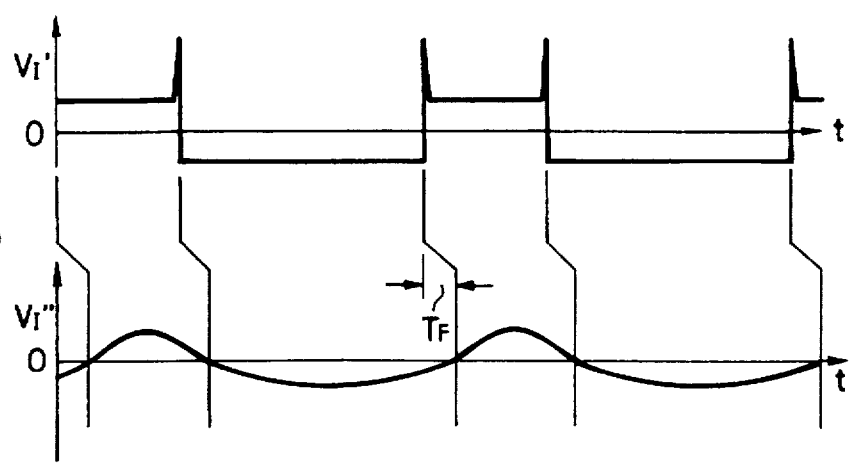
FIG. 9C
FIG. 9D
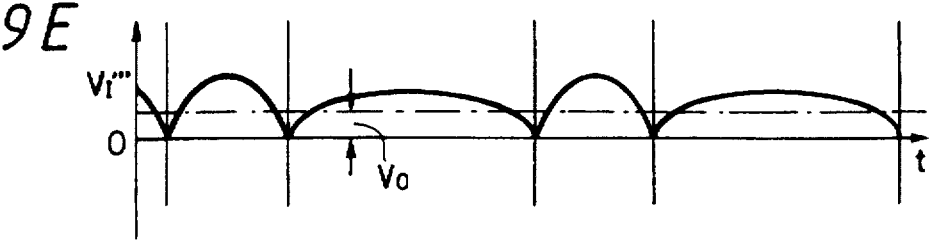
FIG. 9E

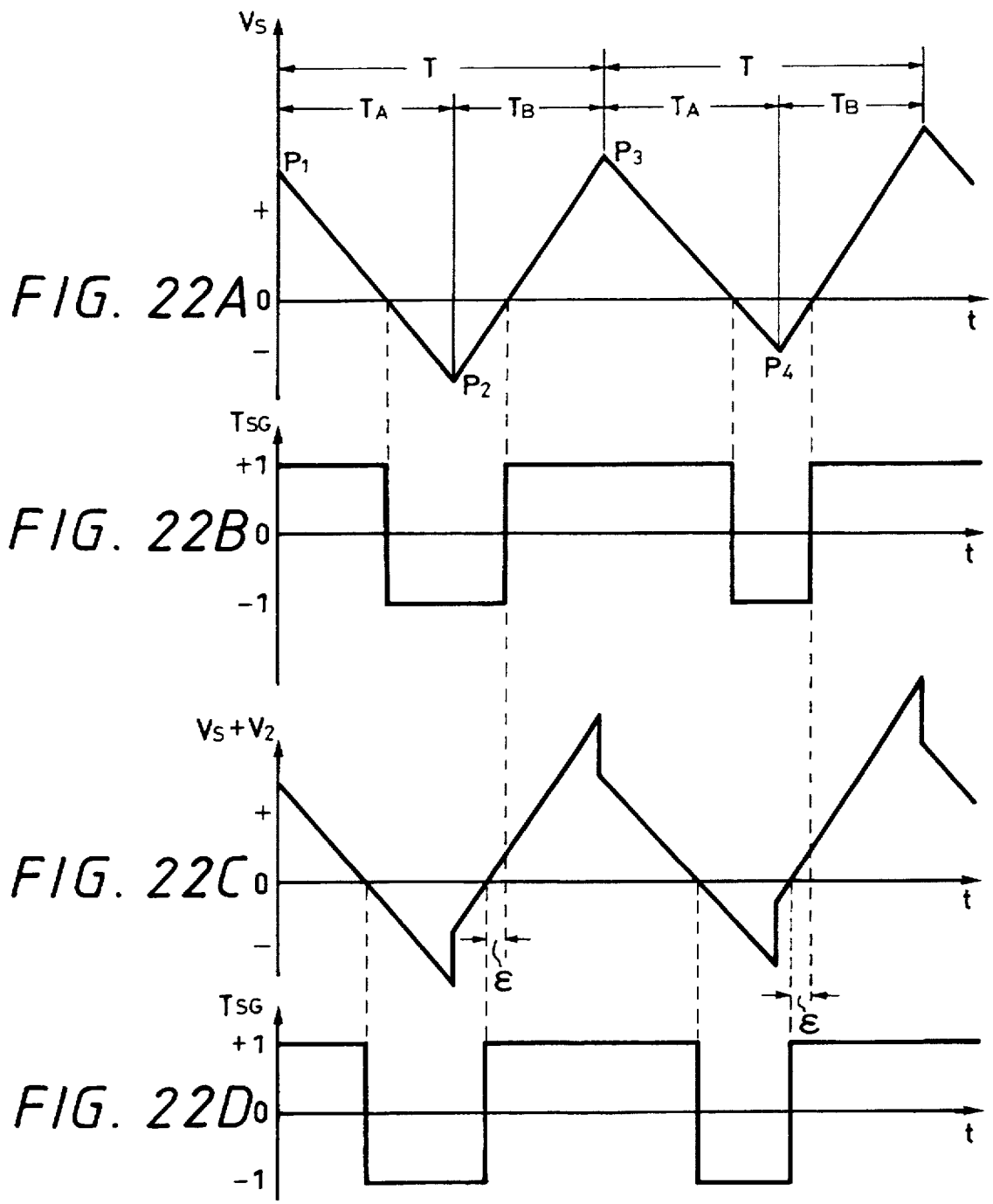

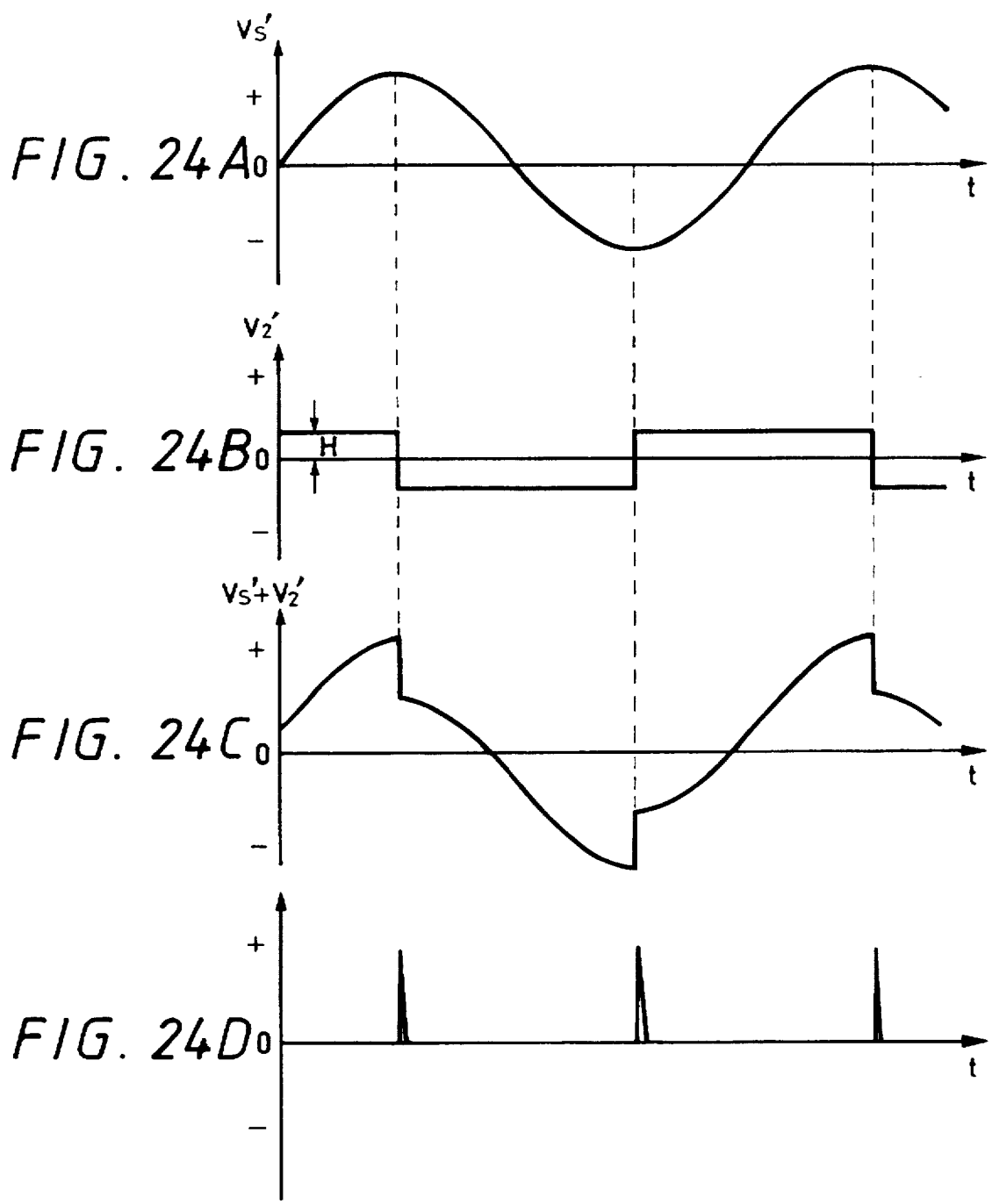

CLOSED LOOP TYPE FIBER OPTIC GYROSCOPE FOR MEASURING ABSOLUTE ROTATION BY DELTA SERRODYNE WAVE PHASE MODULATION

BACKGROUND OF THE INVENTION

The present invention relates to fiber optic gyros for use as rotation rate sensors of airplanes, ships, automobiles or the like, for example.

Heretofore, fiber optic gyros are widely used as apparatus for measuring a rotation rate, because they are small in size and highly reliable. Fiber optic gyros are adapted to measure a rotation rate by use of the Sagnac effect. As interferometric fiber optic gyros, there are known open-loop system, closed-loop system with serrodyne modulation and another control system with digital modulation which will be described below.

With reference to FIG. 1, an open-loop system fiber optic gyro will be described first.

As shown in FIG. 1, a fiber optic gyro apparatus comprises a light-emitting device 1 such as a semiconductor laser or light-emitting diode, a light-receiving device 2 for converting detected light into a current, an optical fiber loop 3 formed by turning one optical fiber a plurality of times, a polarizer 4, first and second couplers 5, 6 for splitting and recombining light propagated in the optical fiber and a phase modulator 8 disposed at one end of the optical fiber loop 3.

Light outputted from the light-emitting device 1 is traveled through the first coupler 5 and the polarizer 4 and splitted into two ways by the second coupler, thereby two beams being propagated within the optical fiber loop 3 in the opposite directions. Specifically, one beam is propagated within the optical fiber loop 3 in the clockwise direction, and the other beam is propagated within the optical fiber loop 3 in the counter-clockwise direction.

When an extraneous rotation rate $\Omega$ is applied to the optical fiber loop 3, owing to the Sagnac effect, a phase difference $\Delta\theta$ is generated between two beams which are propagated within the optical fiber loop 3 in the opposite directions. Such phase difference $\Delta\theta$ is referred to as a Sagnac phase difference. The Sagnac phase difference $\Delta\theta$ is proportional to the rotation rate $\Omega$ and expressed by the following equation (1):

$$\Delta\theta = (2\pi DL/\lambda c)\Omega \qquad (1)$$

where D is the loop diameter of the optical fiber loop 3, L is the length of the optical fiber loop 3, $\lambda$ is the wavelength of light outputted from the light-emitting device 1, c is the velocity of light and $\Omega$ is the extraneous rotation rate around the central axis of the optical fiber loop 3.

According to the open-loop system, the beam propagated within the optical fiber loop 3 in the clockwise direction and the beam propagated along the optical fiber loop 3 in the counter-clockwise direction are phase-modulated by the phase modulator 8, respectively. The beam Ec propagated along the optical fiber loop 3 in the clockwise direction and the beam Ecc propagated along the optical fiber loop 3 in the counter-clockwise direction are expressed at respective ends of the optical fiber loop 3 as follows:

$$Ec = E_0 \sin(\omega t - \Delta\theta/2 + \beta_0)$$

$$Ecc = E_0 \sin(\omega t + \Delta\theta/2 + \beta_T) \qquad (2)$$

where $E_0$ is the amplitude, $\omega$ is the angular frequency relative to frequency of light, t is the time, $\Delta\theta/2$ is the phase difference generated owing to the Sagnac effect and $\beta_0$ and $\beta_T$ are the phase differences generated by the phase modulator 8. The phase difference $\beta_0$ of the beam Ec propagated in the clockwise direction is generated when the beam Ec is phase-modulated at the exit of the optical fiber loop 3 after it has been propagated along the optical fiber loop 3 in the clockwise direction. The phase difference $\beta_T$ of light Ecc propagated in the counter-clockwise direction is generated when light Ecc is phase-modulated at the entrance of the optical fiber loop 3 after it has been propagated along the optical fiber loop 3 in the counter-clockwise direction.

Propagation beams Ec and Ecc are recombined by the second coupler 6, and interference light is traveled through the first coupler 5 and detected by the light-receiving device 2. An intensity I of the interference light detected by the light-receiving device 2 is expressed by the following equation (3):

$$\begin{aligned} I &= 2E_0^2[1 + \cos(\Delta\theta + \beta_T - \beta_0)] \\ &= 2E_0^2[1 + \cos(\Delta\theta + \Delta\beta)] \\ &= 2E_0^2(1 + \cos x) \end{aligned} \qquad (3)$$

where $\Delta\beta = \beta_T - \beta_0$ and $x = \Delta\theta + \Delta\beta$. In the fiber optic gyro of non-phase-modulation type ($\Delta\beta = 0$), since the intensity I of interference light detected by the light-receiving device 2 is a function of cosine value of the phase difference $\Delta\theta$, if the inputted rotation rate is small, then a fluctuated amount of intensity I of interference light is small so that an accurate phase difference $\Delta\theta$ cannot be obtained. In the fiber optic gyro of open-loop system ($\Delta\beta \neq 0$), an operation point exists in the region such that a slope of a sine curve is large. Therefore, even when the inputted rotation rate $\Omega$ is small, it is possible to obtain an accurate phase difference $\Delta\theta$.

The phase modulation is carried out by use of a signal having a sine wave with a reference angular frequency $\omega_m$. In such case, the phase differences $\beta_T$ and $\beta_0$ are expressed by the following equations:

$$\beta_T = \beta \sin(\omega_m t + \omega_m \tau/2)$$

$$\beta_0 = \beta \sin(\omega_m t - \omega_m \tau/2) \qquad (4)$$

where $\beta$ is the constant and $\tau$ is the time for beam to propagate along the optical fiber loop 3. From the equation (4), a difference $\Delta\beta = \beta_T - \beta_0$ between the two phase differences $\beta_T$ and $\beta_0$ is calculated as follows:

$$\begin{aligned} \Delta\beta &= \beta_T - \beta_0 = 2\beta \sin(\omega_m \cdot \tau/2) \cdot \cos\omega_m t \\ &= z\cos\omega_m t \end{aligned} \qquad (5)$$

where z is referred to as "phase-modulation Index" and expressed by the following equation:

$$z = 2\beta \sin \omega_m \tau/2 \qquad (6)$$

The phase-modulation index z can be changed by a magnitude of a voltage signal supplied to the phase modulator 8. Substituting the phase difference $\Delta\beta$ of the equation (5) into the equation (3) yields the following equation:

$$I = 2E_0^2[1 + \cos\Delta\theta \cdot \{J_0(z) + 2\Sigma_{k=1}J_{2k}(z)\cos 2k\cdot\omega_m t\} - 2\sin\Delta\theta\cdot\Sigma_{k=0}J_{2k+1}(z)\sin(2k+1)\omega_m t] \qquad (7)$$

where $E_0$ is the constant concerning intensity of light, $\omega_m$ is the angular frequency given by the phase modulator 8, z is the phase-modulation index, $J_0, J_1, J_2, \ldots$ are the harmonic component waves according to the Bessel functions and t is the time.

The equation (7) is expressed by the following equation (8):

$$I = I_0 - I_1 \sin \omega_m t + I_2 \cos 2\omega_m t - I_3 \sin 3\omega_m t + I_4 \cos 4\omega_m t + \ldots \quad (8)$$

where $I_0$, $I_1$, $I_2$, $I_3$, $I_4$ are expressed by the following equation (9). $I_0$ is referred to as "DC component", $I_1$ is referred to as "the first component wave", $I_2$ is referred to as "the second component wave", and $I_3$ is referred to as "the third component wave".

$$I_0 = 2E_0^2\{1 + J_0(z) \cos \Delta\theta\}$$

$$I_1 = 4E_0^2 J_1(z) \sin \Delta\theta$$

$$I_2 = 4E_0^2 J_2(z) \sin \Delta\theta$$

$$I_3 = 4E_0^2 J_3(z) \sin \Delta\theta$$

$$I_4 = 4E_0^2 J_4(z) \sin \Delta\theta \quad (9)$$

In the fiber optic gyro apparatus of open-loop system, the intensity I of interference light received by the light-receiving device 2 contains not only the term of cos Δθ but also the term of sin Δθ as shown in the equation (9), and therefore, when the inputted rotation rate Ω is small and the value of the Sagnac phase difference Δθ is small, the term of sin Δθ is picked up by which the Sagnac phase difference Δθ is calculated so that an accurate value can be obtained.

Referring to FIG. 1, the fiber optic gyro apparatus further includes a current-to-voltage (I/V) converter 7, a signal generator 11, a demodulator 12 and a signal processing unit 13. The I/V converter 7 converts a current signal outputted from the light-receiving device 2 into a voltage signal and outputs the voltage signal to the demodulator 12. Although not shown, the signal generator 11 may include a signal generating unit for generating a reference signal with an angular frequency $\omega_m$ and frequency multipliers for generating pulse signals with angular frequencies $2\omega_m$, $3\omega_m$, $4\omega_m$ by frequency-multiplying the reference signal.

The demodulator 12 receives the signals with angular frequencies $\omega_m$, $2\omega_m$, $3\omega_m$, $4\omega_m$ supplied from the signal generator 11 and the voltage signal outputted from the I/V converter 7, and initially eliminates the DC component $I_0$ from the intensity signal I of interference light. Then, the demodulator 12 obtains signal components such as the first component wave $I_1$, the second component wave $I_2$, the third component wave $I_3$ and the fourth component wave $I_4$ by demodulating the interference light intensity signal I with the signals having the angular frequencies $\omega_m$, $2\omega_m$, $3\omega_m$, $4\omega_m$.

In order to obtain the Sagnac phase difference Δθ by use of these signals, $E_0$, $J_1$ (z), $J_2$ (z), $J_3$ (z) and $J_4$ (z) may be eliminated from the equation (9). By way of example, $J_1$ (z)=$J_2$ (z). If the maximum value of the modulation index z which satisfy $J_1$ (z)=$J_2$ (z) is taken as an optimum modulation index $z_0$, then $z_0 \approx 2.63$. Accordingly, the phase modulator 8 may carry out the phase modulation in order to satisfy the modulation degree z ≈2.63. Thus, the Sagnac phase difference Δθ is obtained by use of the two expressions in the equation (9). This is calculated by the signal processing unit 13.

Referring to FIG. 2, a conventional closed-loop system with serrodyne modulation fiber optic gyro will be described. The closed-loop system with serrodyne modulation fiber optic gyro is an improvement of the open-loop system and can obtain a wider dynamic range than the open-loop system.

The closed-loop system with serrodyne modulation includes a serrodyne modulator 9 in addition to the phase modulator 8. The beam Ec propagated along the optical fiber loop 3 in the clockwise direction and the beam Ecc propagated along the optical fiber loop 3 in the counter-clockwise direction are phase-modulated by the phase modulator 8 and further serrodyne-modulated by the serrodyne modulator 9. The beam propagated along the optical fiber loop 3 is expressed by the following equation (10) instead of the above equation (2).

$$Ec = E_0 \sin(\omega t - \Delta\theta/2 + \beta_0 + \alpha_t)$$

$$Ecc = E_0 \sin(\omega t + \Delta\theta/2 + \beta_t + \alpha_0) \quad (10)$$

where $\alpha_0$ and $\alpha_T$ are the phase differences generated by the serrodyne modulator 9 with respect to the beam propagated in the clockwise direction and the beam propagated in the counter-clockwise direction along the optical fiber loop 3. The intensity I of interference light detected by the light-receiving device 2 is expressed by the following equation:

$$I = 2E_0^2 |1 + \cos(\Delta\theta + \beta_T - \beta_0 + \alpha_0 - \alpha_T)| \quad (11)$$
$$= 2E_0^2 |1 + \cos(\Delta\theta + \Delta\beta + \Delta\alpha)|$$

where Δβ is the phase difference generated by the phase modulator 8 and Δα is the phase difference generated by the serrodyne modulator 9. Δα is referred to as "serrodyne phase difference".

$$\Delta\beta = \beta_T - \beta_0$$

$$\Delta\alpha = \alpha_0 - \alpha_T \quad (12)$$

As can be seen by comparing the equations (3) with (11), the intensity I of the interference light in the serrodyne modulation system is obtained by substituting Δθ+Δα into the equation (7) instead of Δθ. Accordingly, the DC component, the first component wave, the second component wave, the triple third component wave and the fourth component wave are expressed by the following equation in accordance with the equation (9):

$$I_0 = 2E_0^2\{1 + J_0(z) \cos (\Delta\theta + \Delta\alpha)\}$$

$$I_1 = 4E_0^2 J_1(z) \sin \Delta\theta + \Delta\alpha$$

$$I_2 = 4E_0^2 J_2(z) \sin \Delta\theta + \Delta\alpha$$

$$I_3 = 4E_0^2 J_3(z) \sin \Delta\theta + \Delta\alpha$$

$$I_4 = 4E_0^2 J_4(z) \sin \Delta\theta + \Delta\alpha \quad (13)$$

FIGS. 3A and 3B show the phase difference signals $\alpha_0$, $\alpha_T$ generated by the serrodyne modulation and the serrodyne phase difference Δα. As shown in FIG. 3A, the phase difference signals $\alpha_0$, $\alpha_T$ are sawtooth waves having an amplitude 2π and a period $T_S$. As shown in FIG. 3B, the serrodyne phase difference Δα is a square wave whose value is alternately changed to $\alpha_S$ and $\alpha_S - 2\pi$. Incidentally, as is proportional to the sawtooth wave slope $2\pi/T_S$ and expressed by the following equation:

$$\alpha_S = 2\pi\tau/T_S = 2\pi f_S \tau \quad (14)$$

where $T_S$ is the period of the serrodyne phase difference Δα, $f_S$ (=1/$T_S$) is the frequency of the serrodyne phase difference Δα, and τ is time for beam to be propagated along the optical fiber loop 3.

According to the serrodyne modulation system, propagation beam is phase-modulated by the serrodyne modulator 9 such that sin (Δθ+Δα)=0. Accordingly, Δα=−Δθ is established at a stable point based on the feedback loop including the serrodyne modulator 9. At that time, the sawtooth wave slope $2\pi/T_S$ shown in FIG. 3A is proportional to the Sagnac phase difference Δθ (i.e., rotation rate Ω).

If $\Delta\alpha=\alpha_S=2\pi\tau/T_S$, then regardless of positive and negative signs, $\Delta\theta=2\pi\tau/T_S$. If this is substituted into the equation (1), then the following equation is obtained:

$$\Omega=\lambda c\tau/DLT_S=\lambda c f_S/DL \qquad (15)$$

As shown in FIG. 2, the fiber optic gyro further includes a signal generator 11, a demodulator 12, first and second integrators 15, 16, a counter 17, a reset circuit 18 and a $2\pi$ reference device 19.

The demodulator 12 receives the reference signal with the angular frequency $\omega_m$ outputted from the signal generator 11 and demodulates the first component wave $I_1$, of the equation (13). Accordingly, the first component wave signal $I_1$ is supplied from the demodulator 12 to the first integrator 15. The second integrator 16 generates an inclination signal which increases with a slope proportional to the serrodyne phase difference signal $\Delta\alpha$.

On the other hand, the $2\pi$ signal generated by the $2\pi$ reference device 19 is supplied to the reset circuit 18. The reset circuit 18 generates a $2\pi$ reset signal and resets the inclination signal from the second integrator 16 when the value of the inclination signal increases and reaches $2\pi$. In this manner, the serrodyne waveform signal is generated by the second integrator 16 and such serrodyne waveform signal is supplied to the serrodyne modulator 9.

As described above, the serrodyne modulation system carries out the phase modulation so as to establish sin $(\Delta\theta+\Delta\alpha)=0$. At that time, the output signal $I_1$, from the demodulator 12 becomes zero. Accordingly, at that time, the counter 17 obtains the frequency $f_S$ by counting the number of waves of the serrodyne waveform shown in FIG. 3A. The rotation rate $\Omega$ is obtained from this frequency $f_S$ by the equation (15).

The closed-loop system with digital modulation will be described with reference to FIG. 4, FIGS. 5A through 5D and FIGS. 6A through 6C. According to the digital modulation system, propagation light along the optical fiber loop 3 is phase-modulated by the phase modulator 8, whereby a phase difference $\Delta\beta$ which alternately changes to $\Delta\beta_1=+\pi/2$ and $\Delta\beta_2=-\pi/2$ at every time $\tau$ is generated in the interference light intensity signal I. Accordingly, the intensity signal I of the interference light is expressed by the following equations which are obtained by substituting $\Delta\beta=\pm\pi/2$ into the equation (3):

$$\begin{aligned}
I_1 &= 2E_0^2\{1+\cos(\Delta\theta+\Delta\beta_1)\} \qquad (16)\\
&= 2E_0^2\{1+\cos(\Delta\theta+\pi/2)\}\\
&= 2E_0^2(1-\sin\Delta\theta)\\
I_2 &= 2E_0^2\{1+\cos(\Delta\theta+\Delta\beta_2)\}\\
&= 2E_0^2\{1+\cos(\Delta\theta-\pi/2)\}\\
&= 2E_0^2(1+\sin\Delta\theta)
\end{aligned}$$

Based on the above equation (16), a difference $\Delta I=I_1,-I_2$ between interference light intensities $I_1$, $I_2$ obtained when the phase difference is $\Delta\beta_1=+\pi/2$ and $\Delta\beta_2=-\pi/2$ is calculated by the following equation:

$$\begin{aligned}
\Delta I &= I_1 - I_2 = 2E_0^2(1-\sin\Delta\theta) - 2E_0^2(1+\sin\Delta\theta) \qquad (17)\\
&= -4E_0^2\sin\Delta\theta
\end{aligned}$$

Since the right-hand side of the equation (17) does not contain the phase difference $\Delta\beta$ generated by the phase modulator 8, the Sagnac phase difference $\Delta\theta$ can be obtained. As described above, according to the digital modulation system, the phase modulator 8 generates the phase difference $\Delta\beta=\pm\pi/2$ which changes at every time $\tau$ in the interference light I. Then, the difference $\Delta I$ between the intensity $I_1$ obtained when the phase difference is $\Delta\beta_1=+\pi/2$ and the intensity $I_2$ obtained when the phase difference is $\Delta\beta_2=-\pi/2$ is calculated, from which the value of $\Delta\theta$ is obtained.

The digital modulation system will be described more specifically with reference to FIGS. 5A to 5D and FIGS. 6A to 6E. According to the digital modulation system, clockwise beam Ecw is digitally phase-modulated such that a phase difference $\beta_0$ is of a square wave having a period $2\tau$ and an amplitude $\pi/4$ as shown in FIG. 5A, for example. Counter-clockwise beam Eccw is also digitally phase-modulated such that a phase difference $\beta_T$ is of a square wave shown in FIG. 5B. The phase difference $\beta^T$ of the counter-clockwise beam Eccw has the same square wave as that of the phase difference $\beta_0$ of the clockwise beam Ecw but is delayed from the phase difference $\beta_0$ of the clockwise beam Ecw by the time $\tau$.

As described above, a difference between the phase difference $\beta_0$ of the clockwise beam Ecw and the phase difference $\beta_T$ of the counter-clockwise beam Eccw, i.e., the phase difference $\Delta\beta=\beta_0-\beta_T$ is of a square wave which changes $+\pi/2$ and $-\pi/2$ at every time $\tau$ as shown in FIG. 5C.

FIG. 5D shows a waveform of the phase $x=\Delta\theta+\Delta\beta$ of the equation (3). When the rotation rate $\Omega$ does not act on the fiber optic gyro, $\Delta\theta=0$. Thus, the waveform of the phase x in FIG. 5D is agreed with the phase difference $\Delta\beta$ of FIG. 5C.

With reference to FIGS. 6A to 6C, the manner in which the interference light intensity $I_1$ obtained when the phase difference $\Delta\beta$ is $\Delta\beta_1=-\pi/2$ and the interference light intensity $I_2$ obtained when the phase difference $\Delta\beta$ is $\Delta\beta_2=-\pi/2$ are calculated by the equation (3) or (16) will be described.

FIG. 6A is a graph of the equation (3) which is frequently used to express a relationship between the phase difference x and the intensity I of light. In the graph of FIG. 6A, the horizontal axis represents the phase x $(=\Delta\theta+\Delta\beta)$ and the vertical axis represents an intensity I (x) of interference light. In FIGS. 6B and 6C shown below FIG. 6A, the horizontal axis (vertical axis direction of FIG. 6A) represents the time and the vertical axis (horizontal axis direction of FIG. 6A) represents the phase x $(=\Delta\theta+\Delta\beta)$. In FIGS. 6D and 6E shown on the right-hand side of FIG. 6A, the horizontal axis (horizontal axis direction of FIG. 6A) represents the time and the vertical axis (vertical axis direction of FIG. 6A) represents the intensity I of interference light.

FIG. 6B shows a waveform of the phase x $(=\Delta\theta+\Delta\beta)$ obtained when the Sagnac phase difference $\Delta\theta=0$, and corresponds to the waveform of FIG. 5C. FIG. 6D shows the intensity I of interference light in such case. Similarly, FIG. 6C shows a waveform of the phase x $(=\Delta\theta+\Delta\beta)$ obtained when the Sagnac phase difference $\Delta\theta\neq0$, and corresponds to FIG. 5D. FIG. 6E shows the intensity I of interference light in such case.

When the Sagnac phase difference $\Delta\theta=0$, even if the value of the phase x is alternately changed to $+\pi/2$ and $-\pi/2$ as shown in FIG. 6B, the intensity I of interference light becomes a constant value (except spike-like protrusions) as shown in FIG. 6D. However, when the Sagnac phase difference $\Delta\theta\neq0$, the value of the phase x is alternately changed to $\Delta\theta-\pi/2$ and $\Delta\theta+\pi/2$ at every time $\tau$. At that time, the intensity I of interference light is alternately changed at every time $\tau$ (except spike-like protrusions) as shown in FIG. 6E.

The reason that the value of the intensity I of interference light has the spike-like protrusions at every time $\tau$ in FIG.

6D is that, when the value of the phase x shown by the waveform in FIG. 6B is changed between $-\pi/2$ and $+\pi/2$, the intensity I of interference light of sin e wave shown in FIG. 6A increases. Similarly, the reason that the value of the intensity I of interference light has the spike-like protrusions at every time $\tau$ in FIG. 6E is that, when the value of the phase x shown by the waveform in FIG. 6C is changed between $\Delta\theta-\pi/2$ and $\Delta\theta+\pi/2$, the intensity I of interference light of sine wave shown in FIG. 6A increases.

The period that the square wave shown in FIG. 6E is held at high level expresses the intensity $I_2$ of interference light obtained when the phase $x=\Delta\theta-\pi/2$. Also, the period that the square wave shown in FIG. 6E is held at low level expresses the intensity $I_1$, of interference light obtained when the phase $x=\Delta\theta+\pi/2$. Accordingly, a difference between the high level and the low level of the square wave shown in FIG. 6E corresponds to the interference light intensity deviation $\Delta I=I_2-I_1$. Specifically, a magnitude of a difference between the high level and the low level of the square wave shown in FIG. 6E expresses the right-hand side of the equation (17). As described above, according to the digital modulation system, the square wave of the interference light intensity I shown in FIG. 6E is derived from the sine wave showing the light intensity I shown in FIG. 6A and $\Delta\theta$ is obtained based on the difference between the high level and the low level of the square wave by the equation (17).

Referring back to FIG. 4, the fiber optic gyro of digital modulation system further includes a timing signal generator 21, a phase modulation signal generating unit 22, an A/D (analog-to-digital) converter 23 and a signal processing unit 24. The timing signal generator 21 generates a timing signal with a period $\tau$ and supplies the same to the phase modulation signal generating unit 23 and the signal processing unit 24. The phase modulation signal generating unit 22 generates a phase modulator drive signal for generating the phase differences $\beta_0$, $\beta_T$, $\Delta\beta$ shown in FIGS. 5A, 5B and 5C.

On the other hand, the A/D converter 23 receives the voltage signals (shown in FIGS. 6D and 6E) from the I/V converter 7, generates the digital signal indicating the intensity I of interference light and supplies the values $I_1$ and $I_2$ to the signal processing unit 24. The signal processing unit 24 is operated based on the timing signal from the timing signal generator 21 to alternately memorize the two values $I_1$ and $I_2$ and performs a subtraction shown in the equation (17). The rotation rate $\Omega$ is calculated from the resultant Sagnac phase difference $\Delta\theta$ in accordance with the equation (1).

In the fiber optic gyro apparatus of the open-loop system and the closed-loop system, sin ce the input signal to the demodulator 12 contains not only the sine wave component but also the cosine wave component as shown in the equations (9) and (13), even when the input rotation rate $\Omega$ is zero, the input signal I becomes a large value due to such cos in e wave component. Accordingly, it becomes difficult to increase an AC gain of the demodulator 12. As a result, a noise of the demodulator 12 directly becomes an error source of a gyro signal.

According to the conventional fiber optic gyro apparatus of the phase-modulation system, the output signal from the demodulator 12 is an analog signal containing sin $\Delta\theta$ and is not appropriate for the signal processing unit 13 to digitally calculate the rotation rate $\Omega$. Accordingly, it is difficult to obtain the gyro output $\Omega$ with high accuracy.

According to the conventional fiber optic gyro apparatus of the closed-loop system with the serrodyne modulation, when the input rotation rate $\Omega$ is close to zero, the inclination of the sawtooth waveform shown in FIG. 3A is very small.

Accordingly, the serrodyne period $T_S$ becomes large so that the second integrator 16 cannot substantially be operated as an integrator accurately.

According to the conventional fiber optic gyro apparatus of the closed-loop system with the serrodyne modulation, when the input rotation rate $\Omega$ is large, the serrodyne period $T_s$ becomes small. When the serrodyne frequency $f_S$ becomes close to the phase modulation frequency $f_m=\omega_m/2\pi$, a lock-in phenomenon occurs. In the lock-in range, even when the input rotation rate $\Omega$ is changed, the serrodyne phase difference $\Delta\alpha$ is not changed at all so that it becomes impossible to detect the input rotation rate $\Omega$. To avoid such lock-in phenomenon, it is necessary to introduce a hypothetical input rotation rate $\Omega$ by addition of a dither signal which is an alternating wave signal or the like.

In the fiber optic gyro apparatus of the closed-loop system with the serrodyne modulation, the serrodyne modulation signals $\alpha_0$, $\alpha_T$ are sawtooth waveforms and change suddenly from 2 n to zero, which is referred to as "flyback". However, in actual practice, the serrodyne modulation signals $\alpha_0$, $\alpha_T$ cannot be changed instantly from $2\pi$ to zero and need a time of several nanoseconds to several 100s of nanoseconds depending on a semiconductor switch used, etc. An error caused by such transition time is referred to as "flyback error".

The serrodyne modulation signals $\alpha_0$, $\alpha_T$ can normally flyback to zero just after they reach $2\pi$ accurately. However, it is frequently observed that the serrodyne modulation signals $\alpha_0$, $\alpha_1$ can flyback to zero although they are not equal to $2\pi$. An error caused by the flyback which occurs when the serrodyne modulation signals $\alpha_0$, $\alpha_T$ are not equal to $2\pi$ is referred to as "$2\pi$ error". A complex control loop should additionally be provided in order to eliminate such $2\pi$ error.

In the conventional fiber optic gyro apparatus of the closed-loop system with the serrodyne modulation, such flyback error and the $2\pi$ error are not always constant strictly but are often changed. Since the random-walk is deteriorated, it becomes difficult to eliminate the error.

In the conventional fiber optic gyro apparatus of the digital modulation system, the period of the square wave signal $\beta_0$, $\beta_T$ used in phase modulation is $2\tau$ ($\tau$ is a time for beam to be propagated along the optical fiber loop 3). Consequently, when the optical fiber loop 3 of ordinary length is used, a frequency corresponding to such period $2\pi$ is in the order of megahertz so that all circuits used become high-frequency circuits. Accordingly, an electrical noise or the like should be eliminated, and the fiber optic gyro apparatus becomes expensive compared with case that low-frequency circuits are used.

Conventional fiber optic gyro apparatus have in common a problem of bias. The bias is a common problem which concerns all fiber optic gyro apparatus of the open-loop system, the closed-loop system with the serrodyne modulation and the closed-loop system with digital modulation.

When the input rotation rate $\Omega$ does not act on the fiber optic gyro apparatus, the Sagnac phase difference $\Delta\theta$ expressed by the equation (1) is zero. The input rotation rate $\Omega$ is a rotation rate around an axis passing the center of the loop of the optical fiber loop 3 (hereinafter simply referred to as "central axis of optical fiber loop 3") and is perpendicular to the loop surface.

If input rotation rate $\Omega$ is zero, then the output of the fiber optic gyro apparatus does not become zero, and the fiber optic gyro apparatus outputs a very small value, which is a bias. In the case of the phase-modulation system, for example, when the input rotation rate $\Omega$ is zero, an output signal is the bias which is exactly the same as the signal $I_1$ expressed by the equation (9) and is not caused by the Sagnac phase difference $\Delta\theta$.

There are biases generated by an electrical circuit and an optical system. The bias generated by the electrical circuit can comparatively easily be eliminated by electrically correcting the bias. However, it is not easy to eliminate the bias generated in the optical system.

It is possible to convert the optical bias into an electrical signal and then to eliminate such electrical signal. However, optical biases are generated due to various causes. Therefore, optical biases are changed due to aging and environmental conditions such as a temperature and it is difficult to eliminate such optical biases simultaneously and permanently.

There are pointed out various reasons which cause optical biases. By way of example, when the voltage signal is applied to the phase modulator 8 in order to phase-modulate beam propagating along the optical fiber loop 3, a very small amplitude-modulation (intensity-modulation) also is generated together with the phase-modulation. Accordingly, it is said that, when there coexist two modulations, there is generated a bias.

It is known that $f=1/2\tau$ is used as a phase-modulation frequency in order to eliminate the amplitude modulation (intensity modulation). This frequency is referred to as "ideal frequency". $\tau$ is a time for light to propagate along the optical fiber loop 3.

If the length of the optical fiber loop 3 is extended, then the ideal frequency $f=1/2\tau$ is reduced. However, in the case of fiber optic gyro for detecting an ordinary rotation rate whose measurement range lies from 0 to several 100s of degrees/second, the ideal frequency corresponds to a high frequency ranging from several 100s of kHz to several MHz. Accordingly, such fiber optic gyro needs a high-frequency circuit. Therefore, as compared with a fiber optic gyro usin g a low-frequency circuit usin g a frequency ranging from several kHz to several 10s of kHz, the above fiber optic gyro faces a problem of occurrence of induction and becomes expensive.

SUMMARY OF THE INVENTION

In view of the aforesaid aspect, it is an object of the present invention to provide a fiber optic gyro apparatus which can eliminate the defects encountered with the conventional fiber optic gyro of phase-modulation system, serrodyne modulation system and digital modulation system.

It is another object of the present invention to provide a fiber optic gyro apparatus which can eliminate a bias generated optically.

It is still another object of the present invention to provide a fiber optic gyro apparatus in which a bias generated optically can be eliminated effectively by a simple method.

According to the present invention, there is provided a fiber optic gyro comprisin g a light source, an optical fiber loop, a phase controller for changing a phase between first propagating beam and second propagating beam propagating along the optical fiber loop in opposite directions and a light-receiving device for detecting interference light of said first propagating beam and said second propagating beam in which a rotation rate $\Omega$ is obtained from the Sagnac phase difference $\Delta\theta$ generated in an interference light intensity signal I when the optical fiber loop is rotated around a central axis of a loop at the rotation rate $\Omega$. This fiber optic gyro characterized in that the phase controller generates a reference phase difference $\Delta\theta$ and a ramp phase difference (a in the interference light intensity signal I, the reference phase difference $\Delta\beta$ has a constant period T, the reference phase difference $\Delta\beta$ becomes first and second reference phase differences $\Delta\beta_A$, $\Delta\beta_B$ in first and second times $T_A$, $T_B$ of one period T, the first and second reference phase differences $\Delta\beta_A$ and $\Delta\beta_B$ are opposite to each other in polarity and absolute values thereof are equal to each other, and the ramp phase difference $\sigma$ is controlled so as to cancel the Sagnac phase difference $\Delta\theta$ and fed back in phase to the propagating beam, and a control voltage signal supplied to the phase controller for generating the reference phase difference $\Delta\theta$ and the ramp phase differences, $\sigma$ has a first inclination corresponding to a phase difference $\Delta\beta_A+\sigma$ during the first time $T_A$ and a second inclination corresponding to a phase difference $\Delta\beta_B+\sigma$ during the time $T_B$, one of the first and second inclinations become negative and the other becomes positive, thereby obtaining a delta serrodyne waveform signal of a triangular wave which inclines at every first and second times $T_A$, $T_B$.

According to the present invention, in the fiber optic gyro, the reference phase difference $\Delta\theta$ becomes $\Delta\beta_A=-(2n-1)\pi/2$ during the first time $T_A$ and $\Delta\beta_B=+(2n-1)\pi/2$ during the second time $T_B$ where n is a positive integer. In other example, the reference phase difference $\Delta\beta$ becomes $\Delta\beta_A=-[(2n-2)\pi/2+\delta]$ during the first time $T_A$ and $\Delta\beta_B=+|(2n-1)\pi/2+\delta|$ where n is a positive integer and $\delta$ is an arbitrary constant which satisfies $|\delta|<\pi/2$.

According to the present invention, in the fiber optic gyro, a sum of the first time $T_A$ and the second time $T_B$ comprising one period of the delta serrodyne waveform signal is constant and $T=T_A+T_B$ and durations of the first time $T_A$ and the second time $T_B$ are adjusted in such a manner that a peak value of the delta serrodyne waveform signal does not exceed a predetermined allowable value.

According to the present invention, in the fiber optic gyro, when a positive time in one period of the delta serrodyne waveform signal is $T_+$ and a negative time is $T_-$, durations of the first time $T_A$ and the second time $T_B$ are adjusted based on a difference $\Sigma T_+-\Sigma T_-$ of a product value or a difference product value $\Sigma(T_+-T_-)$.

According to the present invention, in the fiber optic gyro, wherein an input rotation rate $\Omega$ or a rotation angle is computed based on a difference $\Sigma T_+-\Sigma T_-$ of a product value or a difference product value $\Sigma(T_+-T_-)$ when a positive time in one period T of the delta serrodyne waveform signal is $T_+$ and a negative time is $T_-$ at a stable point of a control loop in which the Sagnac phase difference $\Delta\theta$ is canceled out by the ramp phase difference $\sigma$.

According to the present invention, in the fiber optic gyro, when the positive time $T_+$ and the negative time $T_-$ are counted by a pulse of a predetermined period and pulse numbers are respectively set to $N_+$ and $N_-$, an input rotation rate and a rotation angle are computed based on a difference $\Sigma N_+-\Sigma N_-$ of a product value or a difference product value $\Sigma(N_+-\Sigma N_-)$.

According to the present invention, in the fiber optic gyro, the control voltage supplied to the phase controller is formed of a sum of a constant reference voltage signal V* corresponding to the reference phase difference. The ramp voltage signal $V_R$ corresponding to the ramp phase difference and the ramp voltage signal $V_R$ is generated by integrating a voltage signal corresponding to a difference signal $\Delta I$ between a value $I_A$ of the interference light intensity I in the first time $T_A$ and a value $I_B$ of the interference light intensity I in the second time $T_B$.

According to the present invention, the fiber optic gyro further includes a signal processing unit for receiving the interference light intensity signal I outputted from the light-receiving device and generating a voltage signal $V_O$ corresponding to a difference signal $\Delta I=I_A-I_B$, an integrator for receiving and integrating the voltage signal $V_O$, and a delta serrodyne unit for receiving an output signal $V_R$ of the integrator and generating the delta serrodyne waveform signal.

According to the present invention, in the fiber optic gyro, the signal processing unit includes a DC cancel circuit for canceling a DC component from the interference light intensity signal I to generate an alternating signal which alternately changes to $\pm\Delta I/2$ at every times $T_A$ and $T_B$, an AC amplifier for AC-amplifying an output signal from the DC cancel circuit and a demodulator for obtaining the DC voltage signal $V_O$ from an output signal of the AC amplifier.

According to the present invention, in the fiber optic gyro, the delta serrodyne unit includes an adder for adding a reference voltage signal $V^*$ whose sign alternately changes to positive or negative at every times $T_A$, $T_B$ and the ramp voltage signal $V_R$ outputted from the integrator and a delta serrodyne integrator for integrating an output signal from the adder.

According to the present invention, the fiber optic gyro further comprises a reference phase control unit for generating the reference voltage signal $V^*$ by use of a voltage signal corresponding to a mean value $I_0$ between the interference light intensity signal $I_A$ in the first time $T_A$ and the interference light intensity signal $I_B$ in the second time $T_B$.

According to the present invention, a first phase difference (reference phase difference) $\Delta\beta$ and a second phase difference (ramp phase difference) $\sigma$ are generated in the interference light intensity signal I by use of the triangular waveform, i.e., delta serrodyne waveform signal. The phase x of the interference light intensity signal I becomes $x=\Delta\theta+\sigma+\Delta\beta$. The reference phase difference $\Delta\beta$ is changed to constant values $\Delta\beta_A$ and $\Delta\beta_B$ with the same absolute values and whose signs are changed at every times $T_A$ and $T_B$.

According to the present invention, the ramp phase difference $\sigma$ is controlled so as to satisfy $\Delta\theta+\sigma=0$. Accordingly, at the stable point of the control loop, the Sagnac phase difference $\Delta\theta$ becomes the ramp phase difference $\sigma$, and the phase x of the interference light intensity signal I does not contain the Sagnac phase difference $\Delta\theta$ and hence $x=\Delta\beta$.

Accordingly, it is possible to select a position of a desired operation point by setting such reference phase difference $\Delta\beta$ to a predetermined value. Specifically, regardless of the value of the Sagnac phase difference $\Delta\theta$, the operation point is constantly located on the curve of the sine wave. In this manner, since the operation point at the stable point in the control loop can be set at a predetermined point in the area in which the slope of the sine wave signal is large, the phase difference $\Delta\theta$ can be obtained with high sensitivity.

According to the preferred embodiment of the present invention, the reference phase difference $\Delta\beta$ is alternately changed to $\Delta\beta_A=-(2n-1)\pi/2$ during the time $T_A$ and $\Delta\beta_B=+(2n-1)\pi/2$ during the time $T_B$ where n is an integer. In such case, the phase x of the interference light intensity signal I is presented as $x=\Delta\theta+\sigma+\Delta\beta=\Delta\theta+\sigma\pm(2n-1)\pi/2$. The difference $\Delta I$ between the interference light intensity signal $I_A$ at the first operation point $\Delta\beta_A$ and the signal $I_B$ at the second operation point $\Delta\beta_B$ is presented as $\Delta I=2I_0 \sin(\Delta\theta+\sigma)$. Since $\Delta\theta+\sigma=0$ at the stable point in the control loop, the signal $\Delta I$ is presented as $\Delta I=0$.

The delta serrodyne waveform signal has the triangular waveform which decreases in the (lower) right direction during the time $T_A$ of one period $T=T_A+T_B$ and which increases in the (upper) right direction in the time $T_B$. According to the present invention, the inclination of the delta serrodyne waveform signal corresponds to the ramp phase difference $\sigma$, i.e., the Sagnac phase difference $\Delta\theta$. As the input rotation rate $\Omega$ increases, one inclination of the delta serrodyne waveform signal increases. Since the period T of the delta serrodyne waveform signal is constant, if one inclination increases, then the peak value of the delta serrodyne waveform signal exceeds an allowable value. According to the present invention, the period $T=T_A+T_B$ of the delta serrodyne waveform signal is constant and the durations of the times $T_A$, $T_B$ within one period T are adjusted. Therefore, even when the inclination of the delta serrodyne waveform signal increases, the peak value can fall within the allowable value.

According to the embodiment of the present invention, the times $T_A$, $T_B$ within one period T $(=T_A+T_B)$ are corrected by the correction time $\Delta t$. For example, the time $T_A$ is increased or decreased by the correction time $\Delta t$ relative to the half-period T/2, and in correspondence therewith, the time $T_B$ is decreased or increased relative to the half-period T/2 by the correction time $\Delta t$. Such deviation time $\Delta t$ is set in proportional to the difference $\Delta T$ between the time $T_+$ within one period T $(=T_A+T_B)$ in which the delta serrodyne waveform signal is positive and the time $T_-$ in which the delta serrodyne waveform signal is negative.

According to one preferred embodiment, the reference phase difference $\Delta\beta$ is alternately changed to $\Delta\beta_A=-|(2n-1)\pi/2+\delta|$ during the time $T_A$ and $\Delta\beta_B=+|(2n-1)\pi/2+\delta|$ during the time $T_B$ where n is an integer. Specifically, according to this embodiment, the reference phase difference $\Delta\beta$ need not be controlled so as to accurately become $\pm(2n-1)\pi/2$. The phase x of the interference light intensity signal I is presented as $x=\Delta\theta+\sigma+\Delta\beta+\delta=\Delta\theta+\sigma\pm|(2n-1)\pi/2+\delta|$. Further, the difference $\Delta I$ between the interference light intensity $I_A$ at the first operation point $\Delta\beta_A$ and the signal $I_B$ at the second operation point $\Delta\beta_B$ is presented as $\Delta I=2I_0 \sin(\Delta\theta+\sigma) \cdot \cos\delta$. Since $\Delta\theta+\sigma=0$ at the stable point in the control loop, the signal difference $\Delta I$ is presented as $\Delta I=0$.

According to the present invention, there is provided a fiber optic gyro comprising a light source, an optical fiber loop, a phase controller for changing a phase between first propagating beam and second propagating beam propagating along the optical fiber loop in opposite directions and a light-receiving device for detecting interference light of the first propagating beam and the second propagating beam in which a rotation rate $\Omega$ is obtained from the Sagnac phase difference $\Delta\theta$ generated in an interference light intensity signal I when the optical fiber loop is rotated around a central axis of a loop at the rotation rate $\Omega$. This fiber optic gyro is characterized in that the phase controller is supplied with a phase control voltage signal $V_S$ of period T for controlling a phase between the first propagating beam and the second propagating beam and a square wave signal $V_2$ of period T in the added form, the square wave signal $V_2$ has a constant magnitude H and is inverted in polarity at time points in which the phase control voltage signal $V_S$ is maximized and minimized, and the magnitude H and the polarity of the square wave signal $V_2$ are selected in such a manner that an optical bias is minimized.

According to the present invention, in the fiber optic gyro, the magnitude H and the polarity of the square wave signal are selected such that a bias caused by an amplitude modulation generated in accompaniment with a phase modulation is minimized.

According to the present invention, in the fiber optic gyro, the interference light intensity signal I outputted from the light receiving device is demodulated by a detection signal having the same frequency as that of the phase control voltage signal $V_S$ and an operation for switching polarities of said detection signal is synchronized with points at which the phase control voltage signal $V_S$ is maximized or minimized with a constant phase difference.

According to the present invention, in the fiber optic gyro, the phase controller generates a reference phase difference $\Delta\beta$ and a ramp phase difference $\sigma$ in the interference light intensity signal I, the reference phase difference $\Delta\beta$ has a constant period T, the reference phase difference $\Delta\beta$ becomes first and second phase differences $\Delta\beta_A$, $\Delta\beta_B$ during first and second times $T_A$, $T_B$ of one period T, the first and second reference phase differences $\Delta\beta_A$, $\Delta\beta_B$ are opposite in sign but equal to each other in absolute value, the ramp phase difference $\sigma$ is controlled so as to cancel the Sagnac phase difference $\Delta\theta$ and fed back in phase to the propagating beam, the phase control voltage $V_S$ supplied to the phase controller has a first inclination corresponding to a phase difference $\Delta\beta_A+\sigma$ a during the first time $T_A$ and a second inclination corresponding to a phase difference $\Delta\beta_B+\sigma$ during the second time $T_B$ and one of the first and second times $T_A$, $T_B$ becomes negative and the other becomes positive, thereby presenting a delta serrodyne waveform signal of triangular wave which inclines at every first and second times $T_A$, $T_B$.

According to the present invention, in the fiber optic gyro, the reference phase difference $\Delta\beta$ becomes $\Delta\beta_A=-(2n-1)\pi/2$ during the first time $T_A$ and $\Delta\beta_B=+(2n-1)\pi/2$ during the second time $T_B$ where n is a positive integer.

According to the present invention, in the fiber optic gyro, a sum of the first time $T_A$ and the second time $T_B$ composing one period of the delta serrodyne waveform signal is constant $T=T_A+T_B$ and durations of the first time $T_A$ and the second time $T_B$ are adjusted in such a manner that a peak value of the delta serrodyne waveform signal does not exceed a predetermined allowable value.

According to the present invention, the fiber optic gyro further comprises a signal processing unit for receiving the interference light intensity signal I outputted from the light-receiving device and generating a voltage signal $V_O$ corresponding to a difference signal $\Delta I=I_A-I_B$, an integrator for receiving and integrating the voltage signal $V_O$, and a delta serrodyne unit for receiving an output signal $V_R$ of the integrator and generating the delta serrodyne waveform signal.

According to the present invention, in the fiber optic gyro, the signal processing unit includes a DC cancel circuit for canceling a DC component from the interference light intensity signal I to generate an alternating signal which alternately changes to $\pm\Delta I/2$ at every times $T_A$ and $T_B$, an AC amplifier for AC-amplifying an output signal from the DC cancel circuit and a demodulator for obtaining the DC voltage signal $V_O$ from an output signal of the AC amplifier.

BRIEF DESCRIPTION OF THE DRAWINGS

FIGS. 3A and 3B are waveform diagrams used to explain an operation of the conventional fiber optic gyro (closed-loop system with serrodyne modulation);

FIGS. 6A through 6E are diagrams showing a relationship between an interference light intensity signal and a phase difference in the conventional fiber optic gyro (control system with digital modulation);

FIGS. 8A through 8E are diagrams showing a relationship between an interference light intensity signal and a phase difference in the fiber optic gyro according to the present invention;

FIGS. 9A through 9E are waveform diagrams used to explain an operation of a signal processing unit of the fiber optic gyro according to the present invention;

FIGS. 22A through 22D are diagrams used to explain an operation of the fiber optic gyro according to the second embodiment of the present invention;

FIGS. 24A through 24D are diagrams used to explain an operation of the fiber optic gyro according to the third embodiment of the present invention.

DETAILED DESCRIPTION OF THE PREFERRED EMBODIMENTS

The present invention will now be described.

Figure 7:
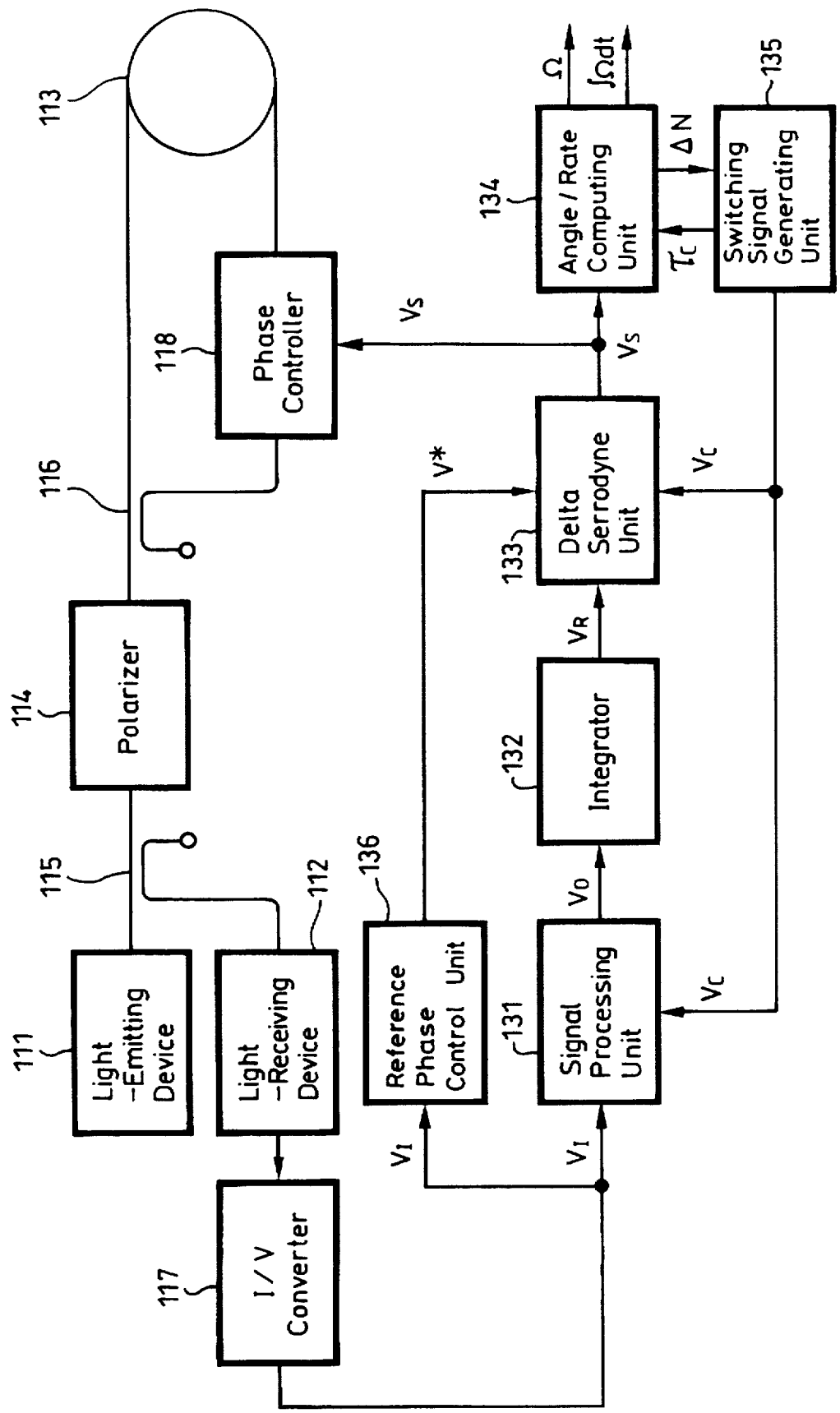
FIG. 7 is a block diagram showing a fiber optic gyro according to a first embodiment of the present invention.

FIG. 7 shows in block diagram a fiber optic gyro according to a first embodiment of the present invention.

As shown in FIG. 7, the fiber optic gyro according to the present invention includes a light-emitting device 111 serving as a light source, a light-receiving device 112 for converting received light into an electrical signal, an optical fiber loop 113, a polarizer 114, two couplers 115, 116, a current-to-voltage (I/V) converter 117 for converting a current signal into a voltage signal and a phase controller 118 for controlling a phase of beam propagating along the optical fiber loop 113. This fiber optic gyro further includes a signal processing unit 131, an integrator 132, a delta serrodyne unit 133, an angle/rate computing unit 134, a switching signal generating unit 135 and a reference phase control unit 136.

A concept of the fiber optic gyro according to the present invention will be described. In the fiber optic gyro according to the present invention, the phase controller 118 generates two phase differences in the interference light intensity signal I, i.e. a reference phase difference $\Delta\beta$ and a ramp phase difference $\sigma$. Initially, the reference phase difference $\Delta\beta$ will be described.

According to the present invention, the reference phase difference $\Delta\beta$ is alternately changed at every times $T_A$ and $T_B$. In the time $T_A$, $\Delta\beta_A = -(2n-1)\pi/2$, and in the time $T_B$, $\Delta\beta_B = +(2n-1)\pi/2$.

Although the period $T = T_A + T_B$ of the reference phase difference $\Delta\beta$ is constant, the times $T_A$, $T_B$ are different except when the input rotation rate $\Omega = 0$. In general, $T_A \neq T_B$, and this will be described later on. The period T may be sufficiently larger than a time $\tau$ which is required by propagating beam to propagate along the optical fiber loop 113. By way of example, the period T may be several 10s of to several 100s of times the time $\tau$.

Although n is a positive integer, n=1 is supposed in the following description at some time. An equation similar to the equation (16) is obtained by substituting $\Delta\beta_A$ and $\Delta\beta_B$ into the equation (3). Incidentally, the constant is substituted as $2E_0^2 = I_0$.

$$\begin{aligned}
I_A &= I_0[1 + \cos(\Delta\theta + \Delta\beta_A)] \\
&= I_0[1 + \cos(\Delta\theta - \pi/2)] \\
&= I_0(1 + \sin\Delta\theta) \\
I_B &= I_0[1 + \cos(\Delta\theta + \Delta\beta_B)] \\
&= I_0[1 + \cos(\Delta\theta - \pi/2)] \\
&= I_0(1 - \sin\Delta\theta)
\end{aligned}$$
(18)

If the difference $\Delta I$ between the interference light intensity I obtained when $\Delta\beta_A = -\pi/2$ and $\Delta\beta_B = +\pi/2$ is calculated, then an equation similar to the equation (17) is obtained.

$$\begin{aligned}
\Delta I &= I_A - I_B = I_0(1 + \sin\Delta\theta) - I_0(1 - \sin\Delta\theta) \\
&= 2I_0\sin\Delta\theta
\end{aligned}$$
(19)

$$\Delta I/2 = I_0\sin\Delta\theta$$

An operation of the fiber optic gyro according to the first embodiment will be described with reference to FIGS. 8A through 8E. FIGS. 8A through 8E are diagrams similar to FIGS. 6A through 6E. Specifically, FIG. 8A is a graph of the equation (3) which is frequently used to express a relationship between the phase difference x and the interference light intensity I. In the graph of FIG. 8A, the horizontal axis represents the phase difference x $(=\Delta\theta+\Delta\beta)$, and the vertical axis represents the interference light intensity I(x). In FIGS. 8B and 8C shown below FIG. 8A, the horizontal axis (vertical axis direction of FIG. 8A) represents the time, and the vertical axis (horizontal axis direction of FIG. 8A) represents the phase difference x $(=\Delta\theta+\Delta\beta)$. In FIGS. 8D and 8E shown on the right-hand side of FIG. 8A, the horizontal axis (horizontal axis direction of FIG. 8A) represents the time and the vertical axis (vertical axis direction of FIG. 8A) represents the interference light intensity I.

Circles A, B on the curve in FIG. 8A show operation points obtained when the Sagnac phase difference is $\Delta\theta=0$. Circles A', B' show operation points obtained when the Sagnac phase difference is $\Delta\theta\neq 0$.

FIG. 8B shows a waveform of the phase x $(=\Delta\theta+\Delta\beta)$ obtained when the Sagnac phase difference is $\Delta\theta=0$. FIG. 8C shows a waveform of the phase x $(=\Delta\theta+\Delta\beta)$ obtained when the Sagnac phase difference is $\Delta\theta\neq 0$. FIG. 8D shows the interference light intensity I obtained when the Sagnac phase difference is $\Delta\theta=0$. Similarly, FIG. 8E shows the interference light intensity I obtained when the Sagnac phase difference is $\Delta\theta\neq 0$.

As shown in FIGS. 8B and 8D, when the Sagnac phase difference is $\Delta\theta=0$, the phase difference $x(=\Delta\theta+\Delta\beta=\Delta\beta)$ is the square wave which is alternately changed to $-\pi/2$ and $+\pi/2$ at every times $T_A$ and $T_B$ as described above so that the interference light intensity I becomes a constant value (except spike-like protrusions) as shown in FIG. 8D.

As shown in FIGS. 8C and 8E, when the Sagnac phase difference is $\Delta\theta\neq 0$, the value of the phase x is alternately changed to $\Delta\theta-\pi/2$ and $\Delta\theta+\pi/2$ at every times $T_A$ and $T_B$ as shown in FIG. 8C so that the interference light intensity I is alternately changed (except spike-like protrusions) at every times $T_A$ and $T_B$ as shown in FIG. 8E.

The high level state of the square wave shown in FIG. 8E expresses an interference light intensity $I_A$ obtained when the phase is $x=\Delta\theta+\Delta\beta_A=\Delta\theta-\pi/2$, and the low level state of the square wave expresses an interference light intensity $I_B$ obtained when the phase is $x=\Delta\theta+\Delta\beta_B=\Delta\theta+\pi/2$. Accordingly, a difference between the high level state and the low level state of the square wave shown in FIG. 8E corresponds to the deviation $\Delta I = I_A - I_B$. Specifically, the difference between the high level and the low level of the square wave shown in FIG. 8E expresses the right-hand side of the equation (19).

The reason that the graph of the interference light intensity I has the spike-like protrusions at every times $T_A$ and $T_B$ in FIG. 8D is that, when the value of the phase difference x shown in FIG. 8B is changed between $x_A=\Delta\theta+\Delta\beta_A$ and $x_B=\Delta\theta+\Delta\beta_B$, the operation points are moved from A to B or from B to A on the sine wave curve shown in FIG. 8A to increase the interference light intensity I. Similarly, the reason that the graph of the interference light intensity I has the spike-like protrusions at every times $T_A$ and $T_B$ in FIG. 8D is that, when the value of the phase difference x shown in FIG. 8B is changed between $x_A=\Delta\theta+\Delta\beta_A$ and $x_B=\Delta\theta+\Delta\beta_B$, the operation points are moved from A' to B' or from B' to A' on the sine wave curve shown in FIG. 8A to increase the interference light intensity I.

The ramp phase difference $\sigma$ will be described. According to the present invention, instead of computing the phase difference $\Delta\theta$ by calculating the difference $\Delta I$ between the high level and the low level of the square wave shown in FIG. 8E according to the equation (19), the ramp phase difference σ is generated in the interference light intensity signal II in addition to the reference phase difference Δβ. Accordingly, the following equation (20) is obtained instead of the equations (18) and (19):

$$I_A = I_0|1 + \cos(\Delta\theta + \Delta\beta_A + \sigma)|$$
$$= I_0|1 + \cos(\Delta\theta - \pi/2 + \sigma)|$$
$$= I_0|1 + \sin(\Delta\theta + \sigma)|$$

$$I_B = I_0|1 + \cos(\Delta\theta + \Delta\beta_B + \sigma)|$$
$$= I_0|1 + \cos(\Delta\theta + \pi/2 + \sigma)|$$
$$= I_0|1 - \sin(\Delta\theta + \sigma)|$$

$$\Delta I = I_A - I_B = 2I_0\sin(\Delta\theta + \sigma) \quad (21)$$

$$\Delta I/2 = I_0\sin(\Delta\theta + \sigma)$$

According to the present invention, as will be described later on in detail, the ramp phase difference σ is controlled so as to satisfy Δθ+σ=0. Therefore, at the stable point of the control loop according to this embodiment, regardless of signs, the Sagnac phase difference Δθ is equal to the ramp phase difference σ.

$$\Delta\theta = -\sigma \quad (22)$$

Substituting the equation (22) into the equations (20) and (21), we have the interference light intensity signal I, the deviation signal ΔI and the amplitude ΔI/2 at the stable point of the control loop.

$$I_A = I_B = I_0$$
$$\Delta I = \Delta I_2 = 0 \quad (23)$$

In case that the ramp phase difference σ is further generated in addition to the reference phase difference Δβ in the interference light intensity signal I, the argument that has been described with reference to FIGS. 8A through 8E holds true. Since at the stable point in the control loop, Δθ+σ=0, the phase x is x=Δθ+σ+Δβ=Δβ, it becomes the same state as established in the example shown in FIGS. 8A through 8E when the Sagnac phase difference ia Δθ=0. Accordingly, the operation points are returned to the circles A, B on the curve shown in FIG. 8A. Therefore, the phase x=Δβ=±π/2 is established as shown in FIG. 8B so that the interference light intensity signal I becomes the constant value $I_O$ shown in FIG. 8D.

When the input rotation rate Ω is changed to change the Sagnac phase difference Δθ, the operation points are moved to the circles A', B' on the curve shown in FIG. 8D with the result that the interference light intensity signal I is changed as shown in FIG. 8C. However, the operation points are again moved to the stable points A, B by controlling the ramp phase difference σθ. Since the operation points A, B are on the fixed points in the area where the slope of the sine wave is large at the stable points of the control loop regardless of the Sagnac phase difference Δθ, a better sensitivity can be obtained as compared with the case that the operation points are moved in an area where the slope of the sine wave is small.

Referring back to FIG. 7, the signal processing unit 131 receives an output signal $V_I$ of the I/V converter 117 and generates a voltage signal $V_O$ corresponding to the amplitude ΔI/2. FIG. 9A shows a waveform of the interference light intensity I corresponding to the input signal $V_I$ of the signal processing unit 131, and FIG. 9B shows a waveform of ΔI/2 corresponding to the output signal $V_O$. At the stable points of the control loop, ΔI/2=0 as shown by the equation (23), and hence the voltage signal $V_O$ is zero.

The voltage signal $V_O$ is time-integrated by the integrator 132 and an integrated value $V_R$ is supplied to the delta serrodyne unit 133. The delta serrodyne unit 133 generates a triangular waveform signal corresponding to the integrated value $V_R$, i.e., a delta serrodyne wave signal $V_S$.

The phase controller 118 controls a phase of beam propagating along the optical fiber loop 113 by the delta serrodyne wave signal $V_S$, whereby the phase difference x is generated in the interference light intensity signal I. The phase x of the interference light intensity signal I is expressed by the following equation:

$$x = \Delta\theta + \alpha_S = \Delta\theta + \sigma + \Delta\beta = \Delta\theta + \sigma \pm (2n-1)\pi/2 \quad (24)$$

where Δθ is the Sagnac phase difference generated by the input rotation rate Ω, $\alpha_S$ is the delta serrodyne phase difference generated by the delta serrodyne wave signal $V_S$, σ is the ramp phase difference generated by the ramp signal contained in the delta serrodyne wave signal $V_S$, and Δβ is the reference phase difference generated by the reference signal contained in the delta serrodyne wave signal $V_S$.

As described above, the reference phase difference Δβ is changed to $\Delta\beta_A$ and $\Delta\beta_B$ at every times $T_A$ and $T_B$. Assuming now that at the time $T_A$, $x_A$ is a phase of the interference light intensity signal I and $\alpha_{SA}$ is a delta serrodyne phase difference, and at the time $T_B$, B is a phase of the interference light intensity signal I and $\alpha_{SB}$ is a delta serrodyne phase difference, then the phases $x_A$, $x_B$ are expressed as:

$$x_A = \Delta\theta + \alpha_{SA} = \Delta\theta + \sigma + \Delta\beta_A = \Delta\theta + \sigma - (2n-1)\pi/2$$
$$x_B = \Delta\theta + \alpha_{SB} = \Delta\theta + \sigma + \Delta\beta_B = \Delta\theta + \sigma - (2n-1)\pi/2 \quad (25)$$

The ramp phase difference σ can be obtained by the inclination of the delta serrodyne wave signal $V_S$ as will be described later on. The angle/rate computing unit 134 computes the ramp phase difference σ or the Sagnac phase difference Δθ from the serrodyne wave signal $V_S$ and further computes the input rotation rate Ω.

The switching signal generating unit 135 generates a switching signal $V_C$ of a period $T=T_A+T_B$ where the signs are alternately changed at every times $T_A$, $T_B$. The reference phase control unit 136 generates a voltage signal V* which contributes to the inclination of the serrodyne wave signal $V_S$.

Figure 10:
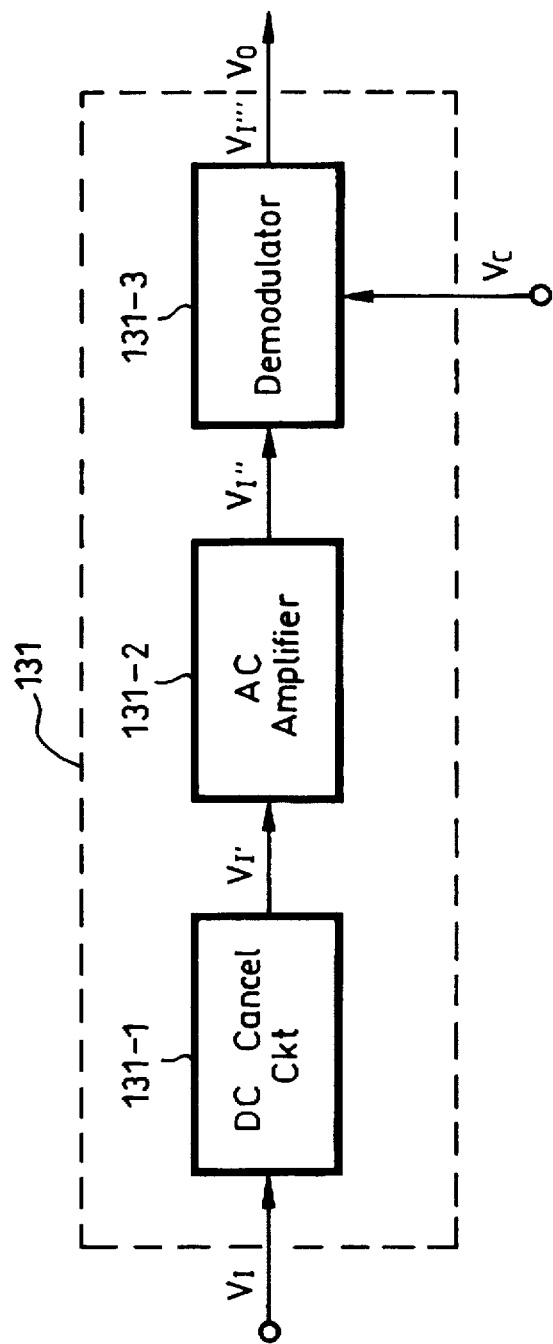
FIG. 10 is a block diagrams showing an example of the signal processing unit of the fiber optic gyro according to the present invention.

The arrangement and operation of the signal processing unit 131 according to this embodiment will be described with reference to FIGS. 9A through 9E and FIG. 10. As shown in FIG. 10, the signal processing unit 131 includes a DC cancel circuit 131-1, an AC amplifier 131-2 and a demodulator 131-3. The signal processing unit 131 is arranged to receive the output signal $V_I$ (see FIG. 9A) from the I/V converter 117, and generate an output voltage signal $V_O$ corresponding to the square wave signal ΔI/2 shown in FIG. 9B.

The output signal $V_I$ from the I/V converter 117 corresponds to the interference light intensity signal I shown in FIG. 8D or 8E. Specifically, the interference light intensity signal I is changed to $I_A$ and $I_B$ shown in the equation (20) at every times $T_A$ and $T_B$. As can be seen from the equation (20), the intermediate value between $I_A$ and $I_B$ is equal to $I_0$. Accordingly, as shown in FIG. 9B, by subtracting the constant $I_0$ from the interference light intensity signal I, there can be obtained a square wave signal ΔI/2 which is changed to +ΔI/2 and −ΔI/2 at every times $T_A$ and $T_B$.

The DC cancel circuit 131-1 eliminates the DC component $I_0$ from the output signal $V_I$ of the I/V converter 117. FIG. 9C shows a waveform of an output signal $V_I'$ of the DC cancel circuit 131-1. The waveform of the interference light intensity signal I outputted from the I/V converter 117 has, in actual practice, has spike-like protrusions generated when it is switched between the high level and the low level of the square wave as shown in FIG. 8D or 8E. Accordingly, the waveform of the output signal $V_I'$ from the DC cancel circuit 131-1 also has corresponding spike-like protrusions in actual practice. Such spike-like protrusions are not shown in the waveform of the interferece light intensity I (see FIG. 9A) for brevity of description.

Although the value proportional to the amplitude $\Delta I/2$ is obtained by demodulating the square wave signal $V_I'$ of FIG. 9C, according to the present invention, in order to obtain a higher accuracy, the square wave signal $V_I'$ is amplified by the AC amplifier 131-2. FIG. 9D shows a waveform of an output signal $V_I''$ of the AC amplifier 131-2. The AC amplifier 131-2 amplifies the square wave signal $V_I'$ to provide the AC waveform $V_I''$ in which signs are alternately changed at every times $T_A$ and $T_B$ as shown in FIG. 9D. The AC amplifier 131-2 includes a bandpass filter to eliminate spike-like protrusions of high-frequency components but generates a very small delay time $T_F$ shown in FIG. 9D.

The output signal $V_I'$ from the AC amplifier 131-2 is supplied to the demodulator 131-3, in which it is demodulated by the switching signal Vc whose signs are changed at every times $T_A$, $T_B$. FIG. 9E shows a waveform of an output signal $V_I'''$ from the demodulator 131-3. The demodulator 131-3 may be a circuit having a function to invert only the polarity at the time $T_B$, for example. A DC component $V_0$ of such signal $V_I'''$ is proportional to the amplitude $\Delta I/2$.

The signal processing unit 131 generates the DC voltage signal $V_0$ proportional to the amplitude $\Delta I/2$ and supplies the same to the integrator 132.

The integrator 132 time-integrates the DC voltage signal $V_0$, and supplies a resultant integrated signal $V_R$ to the delta serrodyne unit 133. Although the signal processing unit 131 according to this embodiment is formed of the AC amplifying system, the signal processing unit 131 may be formed of the conventional demodulator 12 so long as a desired gain can be obtained.

The case that the control loop does not yet reach the stable point has been described so far. When the control loop reaches the stable point, the output signal from the I/V converter 117 becomes a constant value $I_0$ shown by a broken line in FIG. 9A, and the output signal $V_I'$ from the DC cancel circuit 131-1 is not the square wave shown in FIG. 9C but a constant value, i.e., 0. Accordingly, the output signal $V_0$ from the signal processing unit 131 becomes zero.

Figure 11:
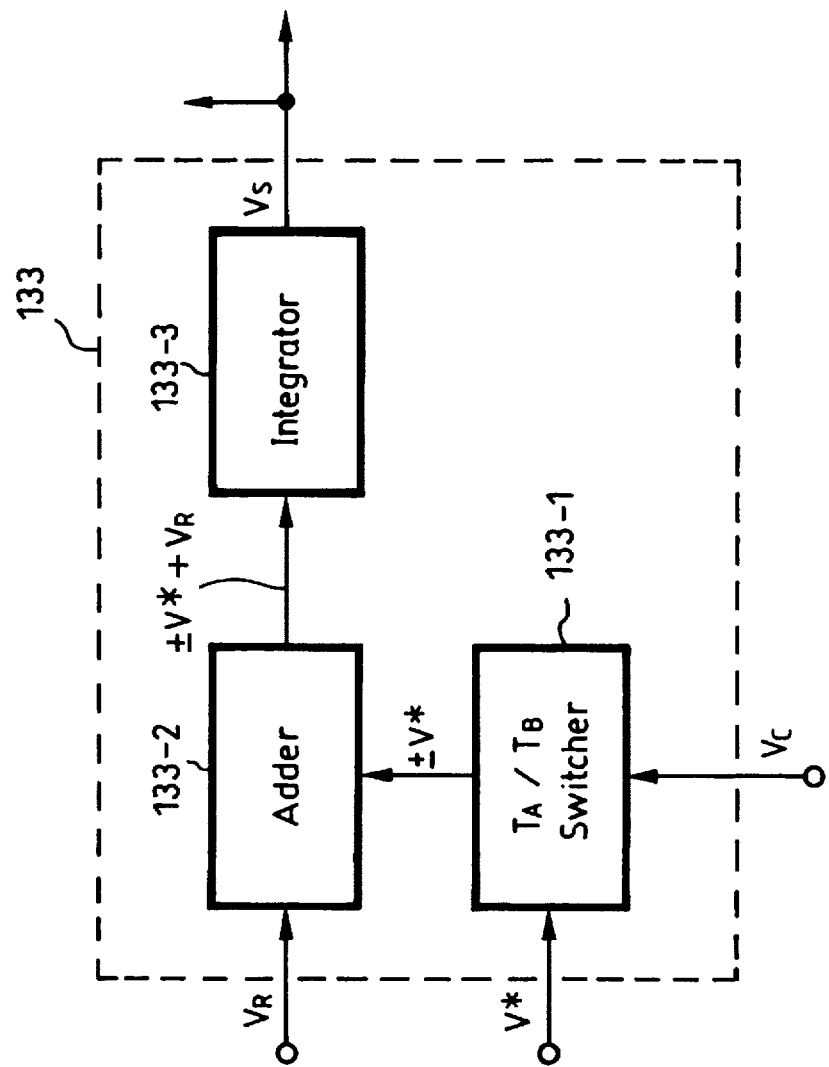
FIG. 11 is a block diagram showing an example of a delta serrodyne unit of the fiber optic gyro according to the present invention.
Figure 12A:
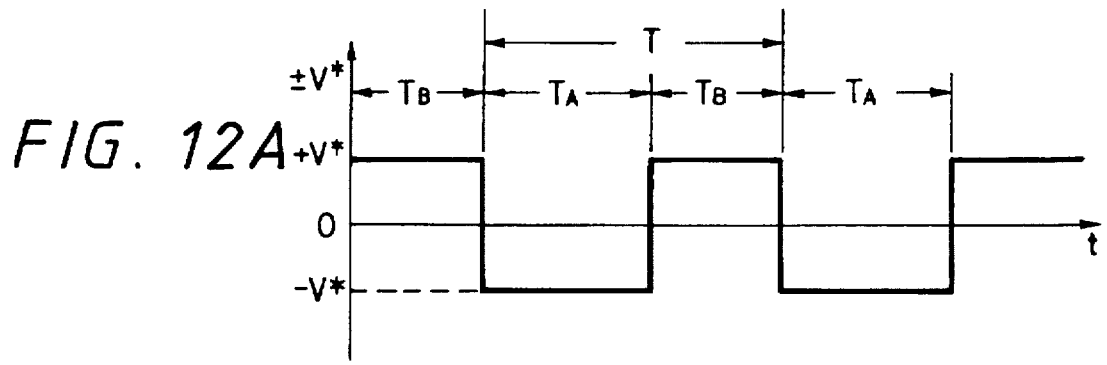
FIGS. 12A to 12C are waveform diagrams used to explain an operation of the delta serrodyne unit of the fiber optic gyro according to the present invention.

The arrangement and operation of the delta serrodyne unit 133 will be described with reference to FIG. 11 and FIGS. 12A to 12C. As shown in FIG. 11, the delta serrodyne unit 133 includes a $T_A/T_B$ switcher 133-1, an adder 133-2 and a delta serrodyne integrator 133-3. The $T_A/T_B$ switcher 133-1 receives the switching signal $V_C$ supplied from the switching signal generating unit 135 and the voltage signal $V^*$ supplied from the reference phase control unit 136 and generates a square wave signal $\pm V^*$ which becomes $-V^*$ during the time $T_A$ and which becomes $+V^*$ during the time $T_B$ as shown in FIG. 12A.

Figure 12B:
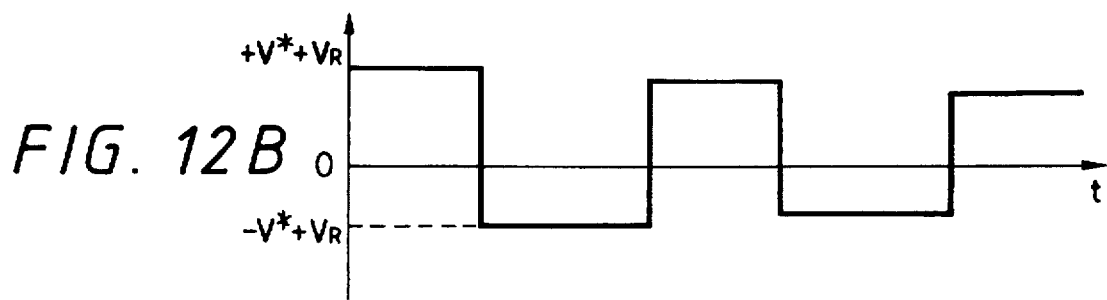

The adder 133-2 generates a square wave signal $\pm V^* + V_R$ shown in FIG. 12B by adding the integrated signal $V_R$ supplied from the integrator 132 and the square wave signal $\pm V^*$ supplied from the $T_A/T_B$ switcher 133-1. Specifically, there is obtained the signal which becomes $-V^* + V_R$ during the time $T_A$ and which becomes $+V^* + V_R$ during the time $T_B$. Although the value of the integrated signal $V_R$ is changed, the signal $-V^* + V_R$ in the time $T_A$ is always negative. Accordingly, the output signal $\pm V^* + V_R$ from the adder 133-2 is alternately changed in positive or negative sign at every times $T_A$ and $T_B$.

Figure 12C:
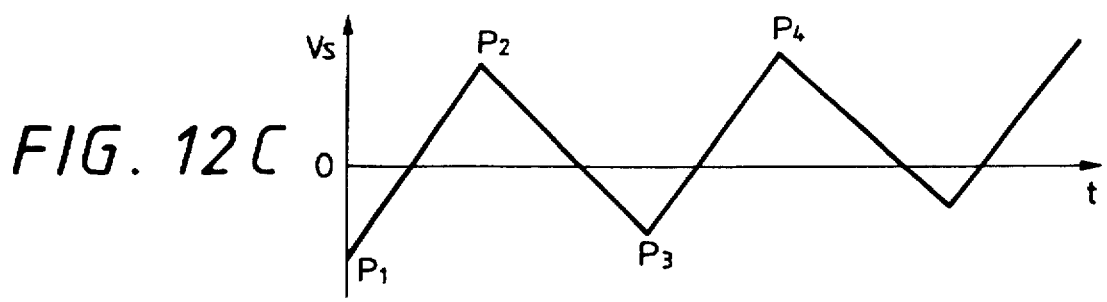

The delta serrodyne integrator 133-3 time-integrates the output signal $\pm V^* + V_R$ from the adder 133-2 to generate a triangular wave signal shown in FIG. 12C, i.e., delta serrodyne waveform signal. Since the delta serrodyne integrator 133-3 integrates a positive signal value $+V^* + V_R(>0)$ during the time $T_B$, there is generated an upper right inclination. Since the delta serrodyne integrator 133-3 integrates a negative signal value $-V^* + V_R(<0)$ during the time $T_A$, there is generated a lower right inclination. As can be seen from FIGS. 12A to 12C, the voltage signal $V^*$ supplied from the reference phase control unit 136 mainly contributes to the inclination of the delta serrodyne waveform.

The delta serrodyne waveform signal $V_S$ generated by the delta serrodyne integrator 133-3 is supplied to the phase controller 118 and thereby beam propagating along the optical fiber loop 113 is phase-modulated. Thus, there is generated the delta serrodyne phase difference $\alpha_S = \Delta\beta + \sigma$ in the interference light intensity signal I.

According to the present invention, since beam is phase-modulated by use of the triangular waveform shown in FIG. 12C, i.e., the delta serrodyne waveform signal, it is possible to prevent the flyback error unlike the conventional fiber optic gyro using the serrodyne waveform signal.

A relationship among the delta serrodyne phase difference $\alpha_S$, in particular, the reference phase difference $\Delta\theta$, the ramp phase difference $\sigma$ and the voltage signals $V^*$, $V_R$ will be described below. Assuming now that k is a voltage-to-phase conversion coefficient of the phase controller 118, $T_I$, is an integrating time of the delta serrodyne integrator 133-3, $d\alpha_{SA}/dt$ is an inclination of delta serrodyne phase angle at the time $T_A$ and $d\alpha_{SB}/dt$ is an inclination of delta serrodyne phase angle at the time $T_B$, then these inclinations are expressed by the following equation:

$$d\alpha_{SA}/dt = k(-V^* + V_R)/T_I$$

$$d\alpha_{SB}/dt = k(+V^* + V_R)/T_I \quad (26)$$

Delta serrodyne phase differences $\alpha_{SA}$ and $\alpha_{SB}$ are obtained by multiplying the inclination of the delta serrodyne phase angle with the time $\tau$ and expressed by the following equation where $\tau$ is a time for beam to propagate along the optical fiber loop 113.

$$\alpha_{SA} = k(-V^* + V_R)\tau/T_I = -kV^*\tau/T_I + kV_R\tau/T_I$$

$$\alpha_{SA} = k(+V^* + V_R)\tau/T_I = +kV^*\tau/T_I + kV_R\tau/T_I \quad (27)$$

Comparing the equations (27) and (25), we have:

$$\Delta\beta_A = -kV^*\tau/T_I$$

$$\Delta\beta_B = +kV^*\tau/T_I$$

$$\sigma = kV_R\tau/T_I \quad (28)$$

As can be seen from the equation (28), the reference phase difference $\Delta\beta_A$, $\Delta\beta_B$ is proportional to the voltage signal $V^*$. In order to obtain the reference phase difference $\Delta\beta = \pm(2n-1)\pi/2$, the voltage signal $V^*$ is set as follows:

$$kV^*\tau/T_I = (2n-1)\pi/2 \quad (29)$$

The ramp phase difference $\sigma$ is proportional to the output signal $V_R$ of the integrator 132. Until the delta serrodyne control loop reaches the stable point, $\Delta\theta + \sigma$ is not zero, i.e., $\Delta\theta + \sigma \neq 0$, and the output signal $V_0$ from the signal processing unit 131 is $V_0 \neq 0$. Accordingly, the integrator 132 integrates such signal $V_O$ to generate the integrated signal $V_R$, whereby the ramp phase difference σ is generated as shown in the equation (26). Therefore, according to the present invention, the ramp phase difference σ is controlled so as to satisfy $\Delta\theta+\sigma=0$, i.e., the output signal $V_O$ of the signal processing unit 131 is zero.

Figure 13A:
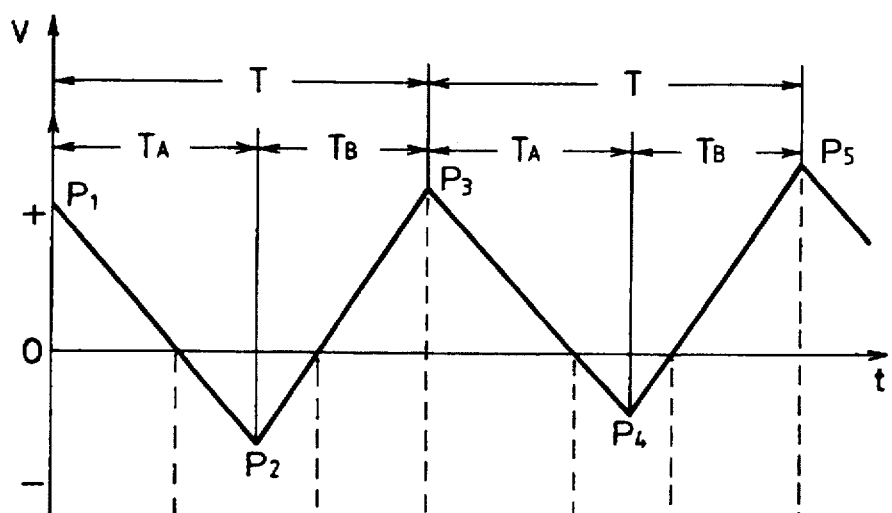
FIGS. 13A to 13C are waveform diagrams used to explain a method for correcting times $T_A$, $T_B$ of one period of the fiber optic gyro according to the present invention.
Figure 13B:
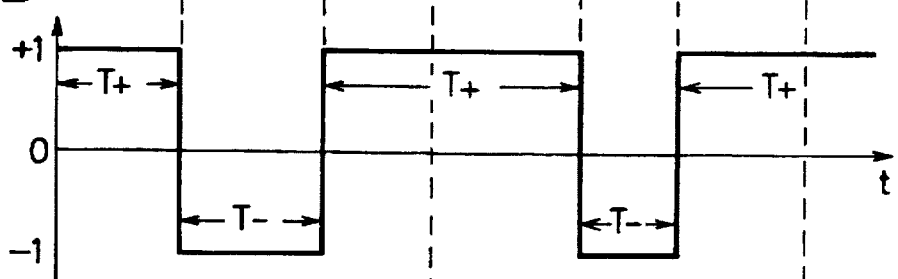
Figure 13C:
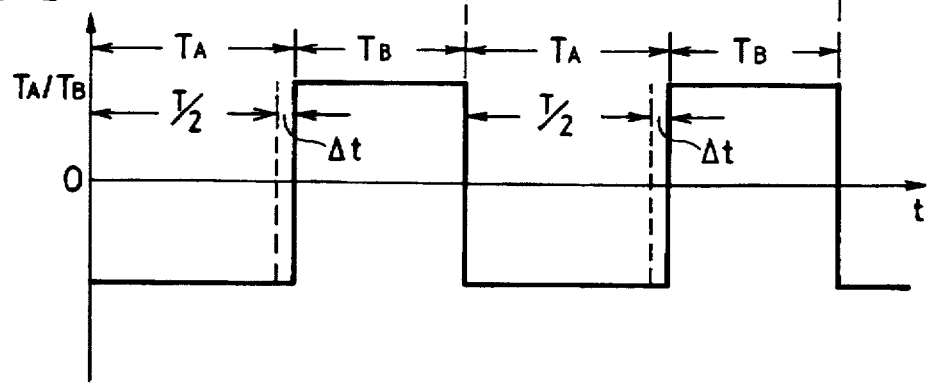

Referring to FIGS. 13A to 13C, a manner in which the two times $T_A$, $T_B$ are controlled will be described. If the times $T_A$ and $T_B$ are constant, then when the input rotation rate Ω acts on the fiber optic gyro, the value of the serrodyne wave signal $V_S$ increases and exceeds an allowable value. When $T_A=T_B=T/2$ and the Sagnac phase difference $\Delta\theta=0$, for example, the delta serrodyne waveform becomes isosceles triangle and the peak value of the serrodyne wave signal $V_S$ is constant. However, when $T_A \neq T_B$ or the Sagnac phase difference $\Delta\theta \neq 0$, the peak value of the serrodyne wave signal $V_S$ increases or decreases at every period T and exceeds an allowable value.

As already described with reference to FIGS. 12B and 12C, the inclination of the delta serrodyne waveform is $-V^*+V_R$ during the time $T_A$ and $V^*+V_R$ during the time $T_B$. Although the output signal $V_R$ of the integrator 132 is not constant, it may be assumed that the output signal $V_R$ is constant during one period T. Accordingly, comparing the absolute values of the inclinations, we have:

$$|V^*+V_R|>|-V^*+V_R| \qquad (30)$$

Accordingly, when $T_A \approx T_B$, at time point $P_3$ after one period T from the time point $P_1$, the value of the serrodyne wave signal $V_S$ is biased to the + side. As the value of the output signal $V_R$ increases, the absolute value of the left-hand side of the equation (30) increases much more and the absolute value of the right-hand side decreases much more. Therefore, the value of the serrodyne wave signal $V_S$ is biased to the +side much more and increases near the allowable value of the serrodyne wave signal $V_S$.

Therefore, according to this embodiment, the times $T_A$, $T_B$ are controlled such that the peak value of the serrodyne wave signal $V_S$ always falls within the allowable value. In general, when the equation (30) is established, if the time $T_A$ is set to be larger than a half-period T/2 and the time $T_B$ is set to be smaller than the half-period T/2, then it is possible to prevent the peak value of the serrodyne wave signal $V_S$ from being increased.

As shown in FIG. 13A, a first half of one period is set to the time $T_A$, and a second half period is set to the time $T_B$. According to this embodiment, although the respective ends (time points $P_1$, $P_3$, $P_5$) of the period T are fixed, intermediate time points $P_2$, $P_4$ (approximately T/2 period) are varied. Specifically, the switching from the one period T to the next period T is carried out by a predetermined method but the switching from the time $T_A$ to the time $T_B$ within one period T is varied.

As shown in FIG. 13B, a time $T_+$ in which the delta serrodyne waveform signal $V_S$ is positive is set to a positive value, and a time $T_-$ in which the delta serrodyne waveform signal $V_S$ is negative is set to a negative value. The positive time $T_+$ and the negative time $T_-$ are generally not equal to each other. If the positive time in one period T is longer $T_+>T_-$, then the delta serrodyne waveform is biased in the + direction (to the upper side) on the whole. Conversely, if the positive time is shorter $T_+<T_-$, then the delta serrodyne waveform is biased to the − direction (to the lower side) on the whole.

Therefore, if the positive time is longer than the negative time within one period T to satisfy $T_+>T_-$, the switching time points $P_2$, $P_4$ are delayed much more in the next period. Specifically, the time $T_A$ is increased and the time $T_B$ is decreased, whereby the whole of the delta serrodyne waveform is displaced in the − direction (to the lower side) and the time points $P_3$, $P_5$ are slightly biased to the lower side.

As shown in FIG. 13C, for example, the time $T_A$ is increased by a correction time $\Delta t$ relative to the half-period T/2, and the time $T_B$ is decreased by the correction time $\Delta t$ relative to the half-period T/2. Such correction time $\Delta t$ may be set to a value proportional to a difference $\Delta T=T_+-T_-$ of the positive and negative times $T_+$, $T_-$ within one period T as:

$$\Delta t = K_T \Delta T \qquad (31)$$

where $K_T$ is a proportional constant. As described above, according to this embodiment, the $T_A/T_B$ switching time point of the next period is advanced or delayed by the correction time $\Delta t$ proportional to the positive and negative time difference $\Delta T$ within one period T. In this manner, according to this embodiment, the delta serrodyne waveform can constantly be stabilized near the central position of one period T.

As a method of stabilizing the serrodyne wave signal $V_S$, there has been described so far the method of obtaining the correction time $\Delta t$ by use of the positive and negative time difference $\Delta T=T_+-T_-$ within one period T. However, the present invention is not limited to the above-mentioned method, and other methods may of course be used without departing from the scope of the present invention.

Figure 14:
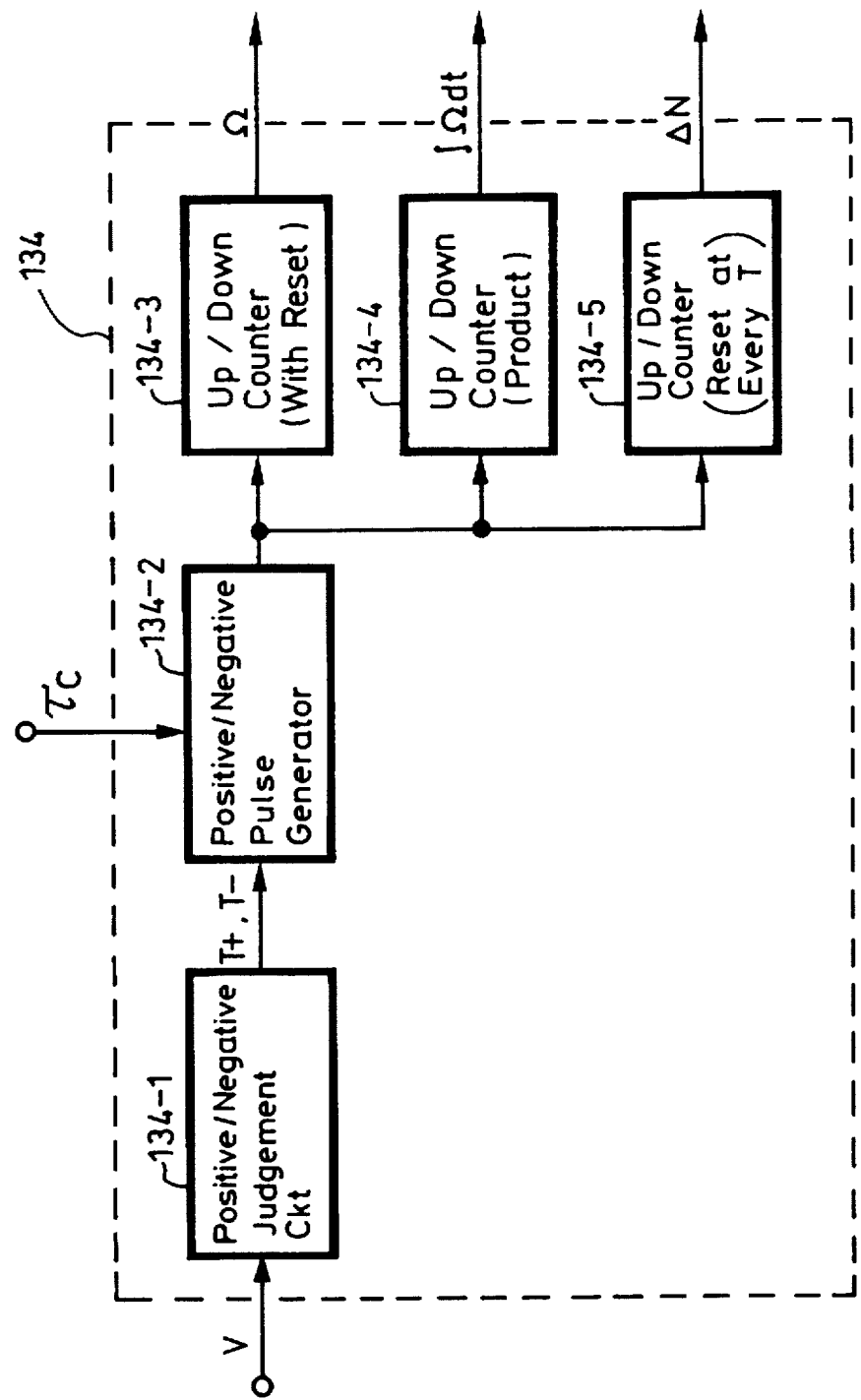
FIG. 14 is a block diagram showing an example of a rotation rate computing unit of the fiber optic gyro according to the present invention.

The arrangement and operation of the angle/rate computing unit 134 will be described with reference to FIG. 14. As shown in FIG. 14, the angle/rate computing unit 134 includes a positive and negative judgement circuit 134-1, a positive and negative pulse generator 134-2 and three up/down counters 134-3, 134-4 and 134-5. The positive and negative judgement circuit 134-1 receives the output signal $V_S$ (shown in FIG. 12C or 13A) from the delta serrodyne unit 133 and judges the positive or negative sign of the output signal $V_S$. The positive and negative judgement circuit 134-1 generates a signal as shown in FIG. 13B whose sign is alternately changed to positive or negative.

The positive and negative pulse generator 134-2 receives a clock signal with a period $\tau_C$ and the output signal from the positive and negative judgement circuit 134-1. Then, the positive and negative pulse generator 134-2 generates a positive pulse signal with a period $\tau_C$ during the time $T_+$ and generates a negative pulse signal with a period $\tau_C$ during the time $T_-$. The period $\tau_C$ may be reciprocal of several 10s of to several 100s of the period T of the delta serrodyne waveform. The pulse signal with the period $\tau_C$ whose sign is changed to positive or negative is supplied to the three up/down counters 134-3, 134-4 and 134-5.

The up/down counters 134-3, 134-4, 134-5 receive an output pulse signal from the positive and negative pulse generator 134-2 and counts the numbers of positive and negative pulses and the difference therebetween. The numbers of positive and negative pulses are set to $N_+$ and $N_-$, and a difference therebetween is set to $\Delta N$.

$$\Delta N = N_+ - N_- \qquad (32)$$

The time $T_+$ during which the delta serrodyne waveform signal $V_S$ is positive is equal to $\tau_C N_+$, and the time $T_-$ during which the delta serrodyne waveform signal $V_S$ is negative is equal to $\tau_C N_-$. Accordingly, the time difference $\Delta T = T_+ - T_1$ is equal to $\tau_C \Delta N$.

$$\Delta T = \tau_C \Delta N \qquad (33)$$

23

The time $T_+$ during which the delta serrodyne waveform signal $V_S$ is positive and the time $T_-$ during which the delta serrodyne waveform signal $V_S$ is negative are relating to the inclinations $d\alpha_{SA}/dt$, $d\alpha_{SB}/dt$ of the delta serrodyne waveform signal $V_S$ expressed by the equation (25). If such inclinations are equal to each other, i.e., $d\alpha_{SA}/dt = d\alpha_{SB}/dt$, the positive and negative times are equal to each other to satisfy $T_+ = T_-$.

A relationship between the ramp phase difference $\sigma$ and the inclinations of the delta serrodyne waveform signal $V_S$ are considered. The time difference $\Delta T = T_+ - T_-$ are relating to a difference $d\alpha_{SA}/dt - d\alpha_{SA}/dt$ between two inclination angles shown in the equation (26). As can be seen clear from the equation (26), such difference is proportional to the ramp phase difference $\sigma = kV_R\tau/T_i$. Accordingly, based on the equation (28), the following relationship is established:

$$\sigma = K_S \Delta N \qquad (34)$$

where $K_S$ is the constant determined based on the whole system. If this relationship and the equations (22) and (1) are used, then the input rotation rate $\Omega$ can be obtained from the positive and negative pulse number difference $\Delta N$.

Initially, the first up/down counter 134-3 will be described. The first up/down counter 134-3 counts the positive and negative pulse number difference $\Delta N$ and holds the count value $\Delta N$. Such count value $\Delta N$ is reset at every predetermined time. Accordingly, the first up/down counter 134-3 outputs a new count value $\Delta N$ at every predetermined time. The input rotation rate $\Omega$ can be obtained from such count value $\Delta N$ by the equations (34), (28), (22) and (1).

The second up/down counter 134-4 will be described. The second up/down counter 134-4 calculates a rotation angle. The rotation angle is obtained by time-integrating the rotation rate $\Omega$. Accordingly, the rotation angle is obtained by integrating the positive and negative pulse number difference $\Delta N$. The second up/down counter 134-4 computes an integrated value $\Sigma\Delta N$ of the positive and negative pulse number difference $\Delta N$. Accordingly, similarly, the rotation angle is obtained by use of the equations (34), (32), (28), (22) and (1).

The third up/down counter 134-5 will be described. The third up/down counter 134-5 counts the positive and negative pulse number difference $\Delta N$ and resets the same at every time T. Accordingly, the third up/down counter 134-5 constantly holds the pulse deviation $\Delta N$ of the previous cycle (period) which is one cycle before the present cycle (period) and supplies such pulse deviation $\Delta N$ to the switching signal generating unit 135.

Figure 15:
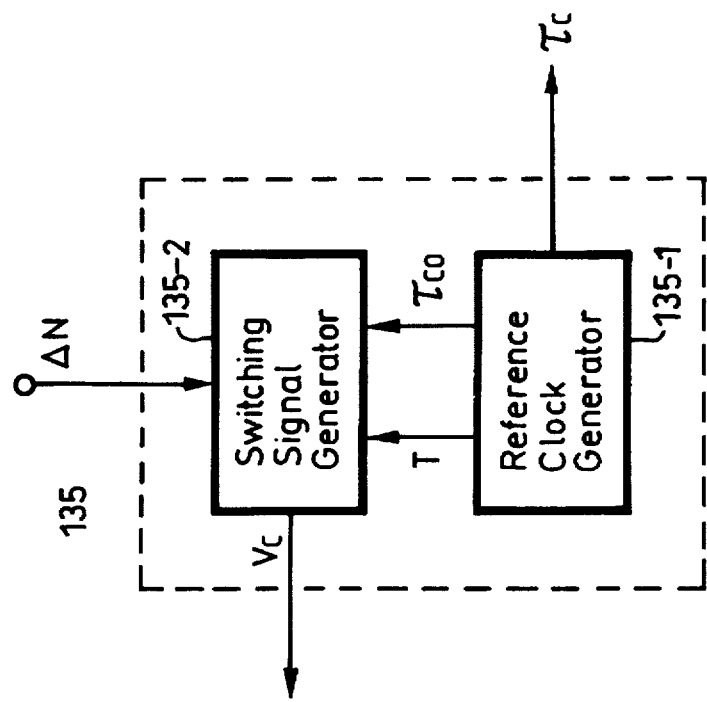
FIG. 15 is a block diagram showing an example of a switching signal generating unit of the fiber optic gyro according to the present invention.

FIG. 15 shows the arrangement of the switching signal generating unit 135 according to this embodiment. As shown in FIG. 15, the switching signal generating unit 135 includes a reference clock generator 135-1 and a switching signal generator 135-2. The reference clock generator 135-1 generates a pulse $\tau_C$ with a period $\tau_C$, a pulse T equal to the period T ($=T_A+T_B$) of the delta serrodyne wave and a pulse $\tau_{CO}$ with a period $\tau_{CO}$ sufficiently smaller than the period T of the serrodyne wave. The pulse $\tau_C$ is supplied to the positive and negative pulse generator 134-2 in the angle/rate computing unit 134.

The switching signal generator 135-2 receives the positive and negative pulse number difference $\Delta N$ outputted from the third up/down counter 134-5 of the angle/rate computing unit 134 and the pulse T and the pulse $\tau_{CO}$ supplied from the reference clock generator 135-1 and generates a switching signal $V_C$ with a period T in which a sign is changed at every times $T_A$ and $T_B$. The process for generating the switching signal $V_C$ includes a computation of the above-mentioned correction time $\Delta t$.

24

According to this embodiment, such correction time $\Delta t$ is obtained by the following equation (35) instead of the equation (31):

$$\Delta t = \gamma \tau_{CO} \Delta N \qquad (35)$$

where the constant $\gamma$ is the arbitrary positive constant smaller than "1" and as the constant $\gamma$, fraction is selected rather than decimal in order to facilitate the counting of pulses. The time $\tau_{CO}$ is an arbitrary time sufficiently smaller than T/2 and may be a value which can satisfy $\tau_{CO} \leq \tau_C$ and which may be suitable for being generated by the reference clock generator 135-1.

During the period in which the positive and negative pulse number difference $\Delta N$ is not supplied from the third up/down counter 134-5, the times $T_A$, $T_B$ Of the switching signal $V_C$ are constant, i.e., $T_A = T_B = T/2$. When the positive and negative pulse number difference $\Delta N$ is supplied from the third up/down counter 134-5, the $T_A/T_B$ switching time point is advanced or delayed relative to the intermediate point of one period by the correction time $\Delta t = \gamma \Delta N \tau_{CO}$.

If $T_+ > T_-$, i.e., $\Delta N > 0$, then the time $T_A$ is extended from the half-period T/2 by the time $\Delta t = \gamma \Delta N \tau_{CO}$ and the time $T_B$ is reduced from the half-period T/2 by the time $\Delta t = \gamma \Delta N \tau_{CO}$. If $T_+ < T_-$, i.e., $\Delta N < 0$, then the time $T_A$ is reduced from the half-period T/2 by the time $\Delta t = \gamma \Delta N \tau_{CO}$, and the time $T_B$ is extended from the half-period T/2 by the time $\Delta t = \gamma \Delta N \tau_{CO}$.

Figure 16:
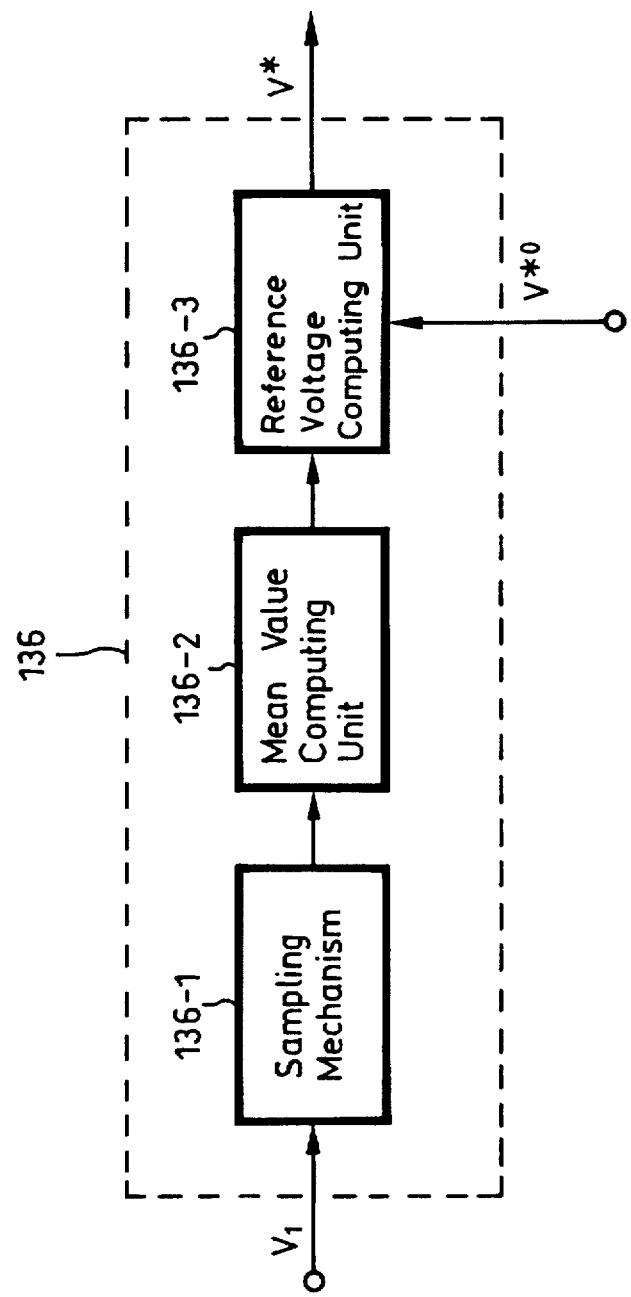
FIG. 16 is a block diagram showing an example of a reference phase control unit of the fiber optic gyro according to the present invention.
Figure 17:
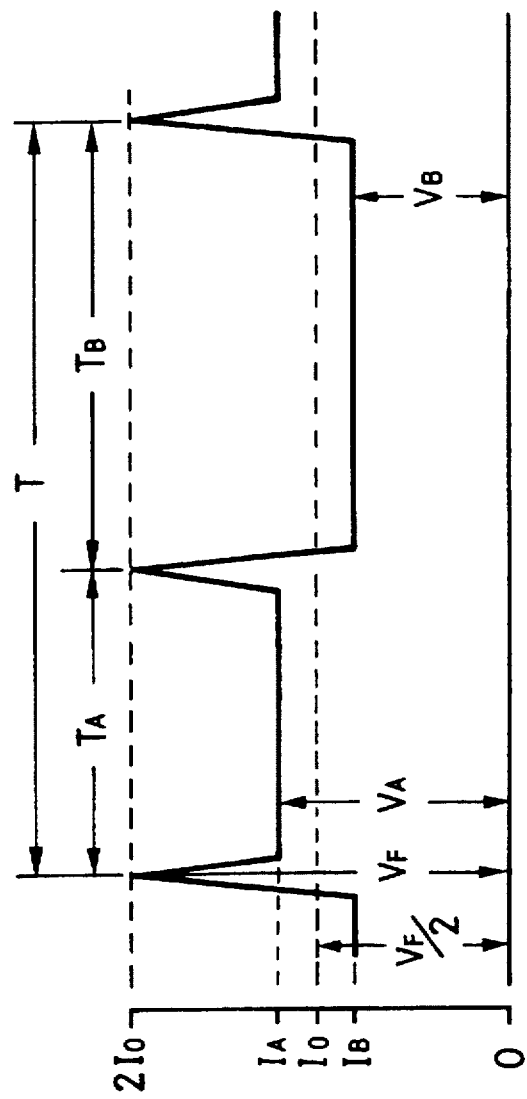
FIG. 17 is a waveform diagram used to explain an operation of the reference phase control unit of the fiber optic gyro according to the present invention.

Referring to FIGS. 16 and 17, the arrangement and operation of the reference phase control unit 136 according to this embodiment will be described. The reference phase control unit 136 is adapted to constantly generate a constant reference voltage signal V*. According to this embodiment, the reference phase control unit 136 generates the reference voltage signal V* by use of the constant voltage signal $I_0$ described with reference to FIG. 9A.

As shown in FIG. 16, the reference phase control unit 136 includes a sampling mechanism 136-1, a mean value computing unit 136-2 and a reference voltage computing unit 136-3. The sampling mechanism 136-1 receives the interference light intensity signal I supplied from the I/V converter 117 and samples the interference light intensity signals $I_A$ and $I_B$ at the times $T_A$ and $T_B$. Also, the sampling mechanism 136-1 samples an interference light intensity signal $2I_0$ corresponding to spike-like protrusions obtained when the times $T_A$, $T_B$ are switched.

FIG. 17 shows the interference light intensity signal I shown in FIG. 8E in an enlarged scale. In FIG. 17, $V_A$ assumes a voltage corresponding to the interference light intensity $I_A$ at the time $T_A$, and $V_B$ assumes a voltage corresponding to the interference light intensity signal $I_B$ at the time $T_B$. Also, $V_F$ assumes a voltage corresponding to the spike-like protrusions generated when the times $T_A$, $T_B$ are switched.

As earlier noted with reference to FIG. 8E, according to this embodiment, the intermediate value of the two interference light intensity signals $I_A$, $I_B$, i.e., the mean value is constantly held at the constant value $I_0$. Accordingly, it is possible to generate the reference voltage signal V* by use of the voltage value corresponding to the constant value $I_0$.

The mean value computing unit 136-2 computes mean values $V_{AM} = (1/N_S)\Sigma V_A$ and $V_{BM} = (1/N_S)\Sigma V_B$ of the voltage values $V_A$, $V_B$ relative to a proper sampling number $N_S$, and further computes a mean value $(V_{AM} + V_{BM})/2$. The voltage mean value $(V_{AM} + V_{BM})/2$ corresponds to the intermediate value $I_0$. The mean value computing unit 136-2 computes a mean value $V_{FM} = (1/N_S)\Sigma V_F$ relative to the proper sampling number $N_S$. Such voltage mean value $V_{FM}$ corresponds to the peak value $2I_0$ of the spike-like protrusion.

Accordingly, it is possible to obtain an accurate and stable reference voltage signal V* by use of the voltage mean value $(V_{AM}+V_{BM})$ corresponding to the intermediate value $I_0$ or the voltage mean value $V_{FM}$ corresponding to the peak value $2I_0$.

The reference voltage computing unit 136-3 computes a deviation $\Delta V_{FM}$ between the resultant value and the voltage mean value $V_{FM}$ by multiplying a sum of two voltage mean values $V_{AM}$, $V_{BM}$ with a constant $1/\mu$. The above computation is expressed by the following equation:

$$\Delta V_{FM}=V_{FM}-(V_{AM}+V_{BM})/\mu \qquad (36)$$

where the constant $1/\mu$ is the constant close to 1. The reference voltage computing unit 136-3 further amplifies and time-integrates the deviation $\Delta V_{FM}$ and adds an initial value $V^{*0}$ to the resultant integrated value, thereby obtaining the voltage signal V*:

$$V^*=V^{*0}+\int \Delta V_{FM} dt \qquad (37)$$

Figure 18:
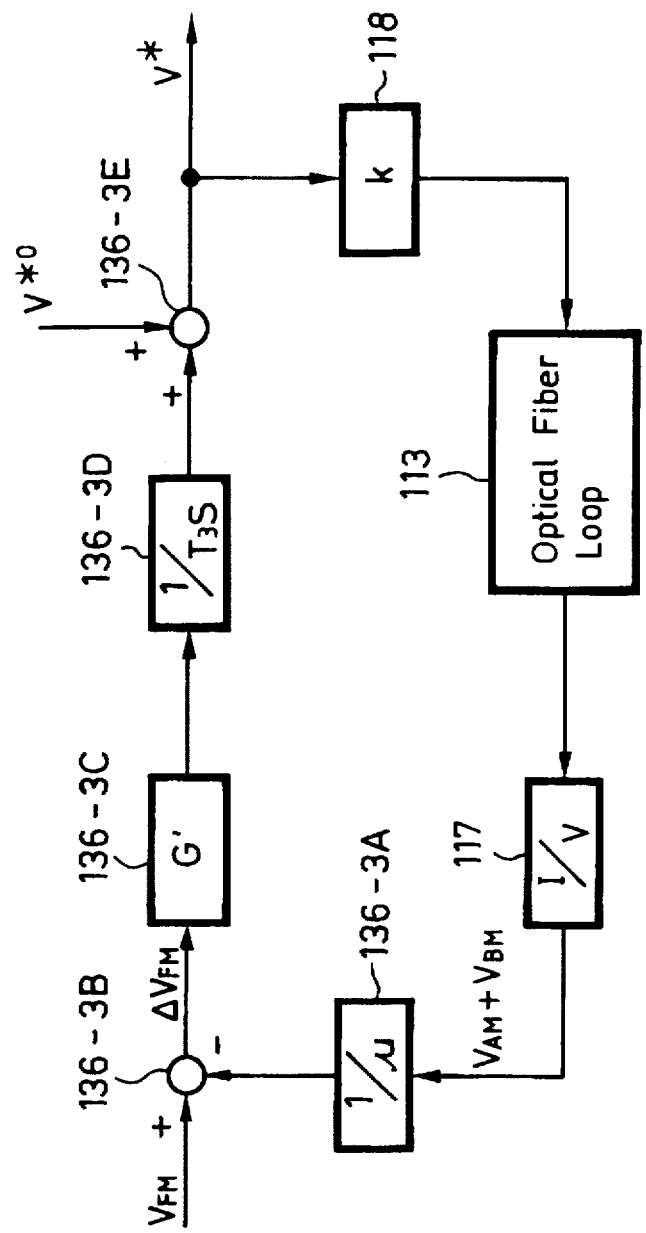
FIG. 18 is a block diagram showing a control loop including the reference phase control unit of the fiber optic gyro according to the present invention.

FIG. 18 shows a control loop including the reference phase control unit 136. As shown in FIG. 18, the reference voltage computing unit 136-3 includes a coefficient device 136-3A for multiplying the sum of the two voltages $V_{AM}$, $V_{BM}$ with the constant $1/\mu$ close to 1, an adder 136-3B for computing the equation (36), an amplifier 136-3C for amplifying the output signal from the adder 136-3B, an integrator 136-3D for time-integrating the output signal from the amplifier 136-3C and an adder 136-3E for computing the equation (37).

In the case of $1/\mu=1$, then $V^*=V_{FM}/2$. In such case, the reference phase difference $\Delta\beta$ becomes $|\Delta\beta|=(2n-1)(\pi/2)$. If $\mu\neq 1$, then a resultant phase difference $\Delta\beta$ becomes $|\Delta\beta|=\mu(2n-1)(\pi/2)$. Since the constant $1/\mu$ can be set to a proper value other than 1, the reference phase difference $\Delta\beta$ can be set in a wide range of $(2n-1)(\mu/2)$. Although the initial value $V^{*0}$ is an arbitrary value, if the initial value $V^{*0}$ is selected to be a value close to the reference value V* used in the beginning, then a response during the period of the starting of the fiber optic gyro becomes quick.

The manner in which the reference phase difference $\Delta\beta$ is expressed as $\Delta\beta=\pm(2n-1)\pi/2$ by use of the positive integer n has been described so far. For brevity, n=1 is assumed in the equations (20) and (21) at some time. Although n may be a positive integer, n=2 may be useful in actual practice. In case n=2, the following equations are obtained instead of the equations (20) and (21):

$$\begin{aligned}
I_A &= I_0[1+\cos(\Delta\theta+\Delta\beta_A+\sigma)] \qquad (38)\\
&= I_0[1+\cos(\Delta\theta-3\pi/2+\sigma)]\\
&= I_0[1-\sin(\Delta\theta+\sigma)]\\
I_B &= I_0[1+\cos(\Delta\theta+\Delta\beta_B+\sigma)]\\
&= I_0[1+\cos(\Delta\theta+3\pi/2+\sigma)]\\
&= I_0[1+\sin(\Delta\theta+\sigma)]\\
\Delta I &= I_A - I_B = -2I_0\sin(\Delta\theta+\sigma) \qquad (39)\\
\Delta I/2 &= -I_0\sin(\Delta\theta+\sigma)
\end{aligned}$$

In general, if n is an odd number, then the equations (20) and (21) are obtained. If on the other hand n is an even number, then the equations (38) and (39) are obtained. Accordingly, in case n is an even number, then the control loop should include a code inverter.

With reference to FIGS. 19A through 19E, a revised embodiment of the first embodiment of the present invention will be described. In the above-mentioned embodiment, the value which results from multiplying the $\pm\pi/2$ with (2n-1) is used as the reference phase difference $\Delta\beta$. However, according to the present embodiment, the reference phase difference $\Delta\beta$ need not always satisfy $\Delta\beta=\pm(2n-1)\pi/2$. According to the present invention, at the stable point of the control loop, the phase x of the interference light intensity signal I is presented as $x=\Delta\beta$ regardless of the value of the Sagnac phase difference $\Delta\theta$. Accordingly, at the stable point of the control loop, the operation point is constantly located at a predetermined position on the sine wave curve regardless of the value of the Sagnac phase difference $\Delta\theta$.

If $\Delta\beta=\pm\pi/2$, for example, then at the stable point of the control loop, the operation point is constantly located at the position of the phase $x=\pm\pi/2$ on the sine wave curve regardless of the value of the Sagnac phase difference $\Delta\theta$.

In order to obtain a predetermined resolution, the phase $x=\Delta\beta$, i.e., the operation point should be located in the area in which the slope of the sine wave curve is sufficiently large. However, the phase, i.e., operation point need not always satisfy $x=\Delta\beta=\pm(2n-1)\pi/2$. An example in which "arbitrary phase" close to $(2n-1)\pi/2$ is used as the reference phase difference $\Delta\beta$ will be described below.

$$\Delta\beta=\pm|(2n-1)\pi/2+\delta| \qquad (40)$$

where $\delta$ represents the arbitrary constant which can satisfy $|\delta|<\pi/2$. n=1 is established for brevity. The interference light intensity signal I is expressed by the following equations similar to the equations (20) and (21):

$$\begin{aligned}
I_A &= I_0[1+\cos(\Delta\theta+\Delta\beta_A+\sigma)] \qquad (41)\\
&= I_0[1+\cos(\Delta\theta-\pi/2+\sigma)]\\
&= I_0[1+\sin(\Delta\theta-\delta+\sigma)]\\
I_B &= I_0[1+\cos(\Delta\theta+\Delta\beta_B+\sigma)]\\
&= I_0[1+\cos(\Delta\theta+\pi/2+\delta+\sigma)]\\
&= I_0[1-\sin(\Delta\theta+\delta+\sigma)]\\
\Delta I &= I_A - I_B \qquad (42)\\
&= I_0[\sin(\Delta\theta-\delta+\sigma)+\sin(\Delta\theta+\delta+\sigma)]\\
&= 2I_0\sin(\Delta\theta+\sigma)\cdot\cos\delta\\
\Delta I/2 &= I_0\sin(\Delta\theta+\sigma)\cdot\cos\delta
\end{aligned}$$

If the equation (22) is established at the stable point in the control loop, then the equation (42) is rewritten as:

$$\Delta I=I_A-I_B=0$$
$$\Delta I/2=0 \qquad (43)$$

Figure 19:
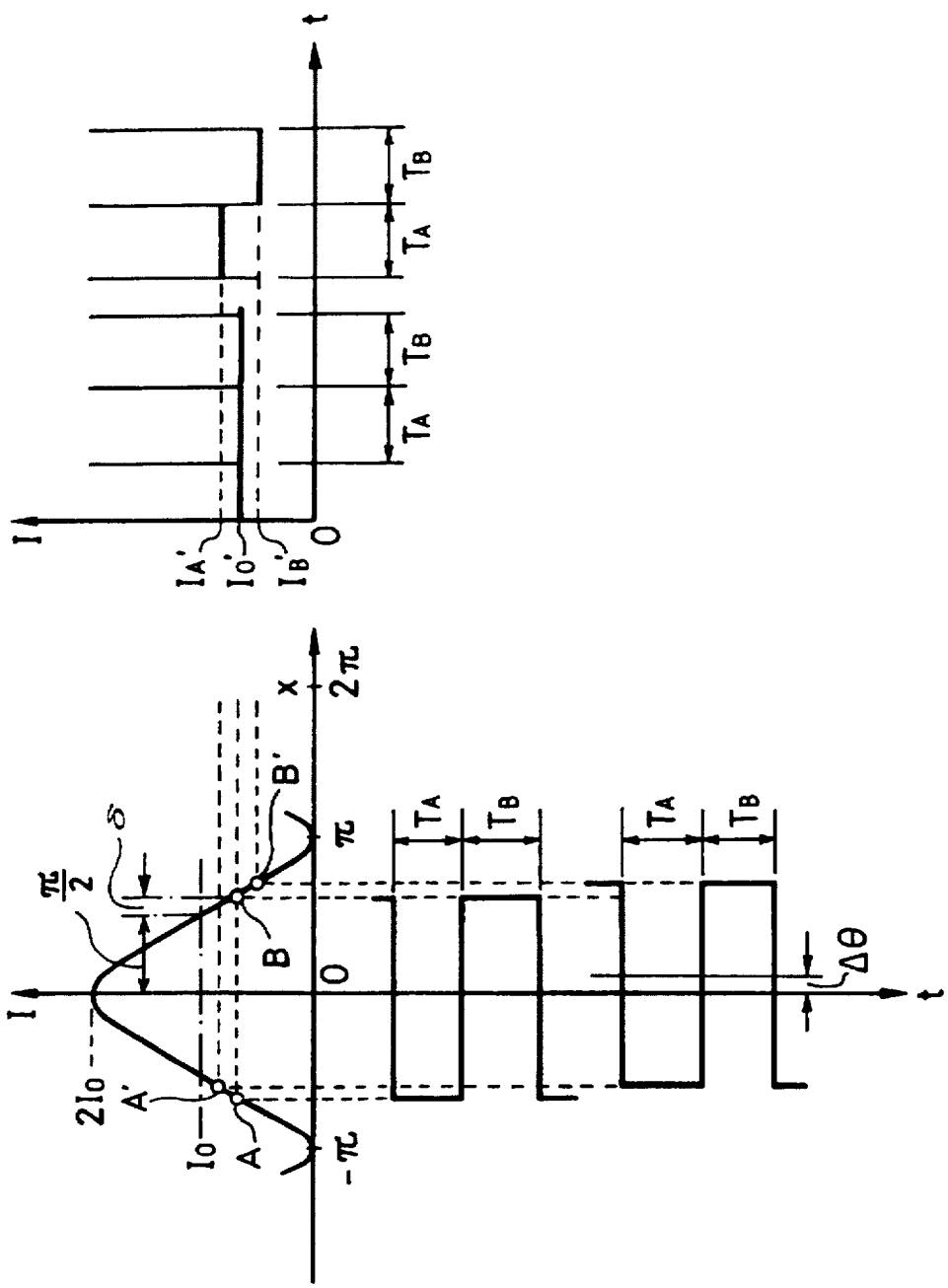
FIGS. 19A through 19E are diagrams showing a relationship between an interference light intensity signal and a phase difference in the fiber optic gyro according to the present invention.

FIGS. 19A through 19E show the manner in which "arbitrary phase" is used as the reference phase difference $\Delta\beta$. FIGS. 19A through 19E are similar to FIGS. 8A through 8E. Circles A, B in FIG. 19A show the state that the control loop reaches the stable point, i.e., the equation (22) is established. Circles A', B' show the state that the Sagnac phase difference $\Delta\theta$ is changed so that the control loop doe not yet reach the stable point. FIG. 19B shows the phase $x=\Delta\beta=\pm(\pi/2+\delta)$ presented when the control loop reaches the stable point, and the phase x may be, for example, approximately equal to $2\pi/3$. FIG. 19D shows the interference light intensity signal I obtained in such case. FIG. 19C shows the phase $x=\Delta\theta+\Delta\beta+\delta=\Delta\theta\pm(\pi/2+\delta)+\delta$. FIG. 19E shows the interference light intensity signal I obtained in such case.

In this manner, so long as the stable points A, B of the control loop are located in the area in which the slope of the sine wave curve is sufficiently large, the present invention can be applied. For example, the AC gain of the signal processing unit 131 may be increased. When "arbitrary phase" with δ added thereto is used, a gain of the signal system should be multiplied with 1/cos δ times. By way of example, the AC gain of the signal processing unit 131 should be increased by 1/cos δ times.

FIG. 7 shows in block form the fiber optic gyro according to the present invention. The fiber optic gyro is not limited thereto and may be arranged so that a combination of the signal processing unit 131, the integrator 132, the delta serrodyne unit 133, the angle/rate computing unit 134, the switching signal generating unit 135 and the reference phase control unit 136 can be replaced by a CPU (central processing unit), an A/D (analog-to-digital) converter, a D/A (digital-to-analog) converter or the like properly.

While the two couplers 115, 116, the polarizer 114 and the phase controller 118 are described as indepenent elements in the example shown in FIG. 7, these elements may be replaced by one optic integrating circuit.

While the conventional fiber optic gyro of the phase-modulation system uses the second component-wave and fourth component-wave demodulators and the second component-wave cancel circuit with a relatively large gain in order to control the phase modulation index, the fiber optic gyro according to the present invention does not need such elements and therefore can be miniaturized and inexpensive.

In the conventional fiber optic gyro of the phase-modulation method, the interference light intensity signal I is obtained as an analog signal containing sin θ or cos θ and the Sagnac phase difference Δθ is obtained from such analog signal so that the conventional fiber optic gyro of the phase modulation method is poor in linearity and accuracy. Further, in the conventional fiber optic gyro of the digital modulation method, the phase differences ±π/2 which are changed digitally are generated in the interference light intensity signal I and the Sagnac phase difference Δθ is obtained from the difference $\Delta I = I_A - I_B$ between the two interference light signals $I_A$, $I_B$. Such deviation signal ΔI is obtained as an analog signal containing sin θ or cos θ so that the conventional fiber optic gyro of the digital modulation method is poor in linearity and accuracy similarly to the conventional fiber optic gyro of the phase modulation method.

In the fiber optic gyro according to the present invention, the reference phase difference Δβ and the ramp phase difference σ are generated in the interference light intensity signal I, the ramp phase difference σ is controlled so as to satisfy Δθ=σ=0, and the Sagnac phase difference Δθ=−σ is obtained from such ramp phase difference σ. Therefore, according to the present invention, since the ramp phase difference σ can be obtained as the digital signal, angles and rates can be computed in a digital method. Thus, the fiber optic gyro according to the present invention is excellent in linearity and accuracy and can exclude errors.

In the fiber optic gyro according to the present invention, at the stable point of the control loop, Δθ+σ=0, the phase difference x of the interference light intensity I is x=Δβ and only the reference phase difference Δβ exists. Therefore, according to the present invention, at the stable point of the control loop, regardless of the value of the Sagnac phase difference Δθ, the operation point is constantly located at the predetermined point on the sine wave curve. Thus, the fiber optic gyro according to the present invention is excellent in linearity and accuracy and can exclude errors.

In the conventional fiber optic gyro of the closed-loop system with serrodyne modulation, since the serrodyne waveform signal, i.e., sawtooth waveform signal is used in the phase modulation, this conventional fiber optic gyro has a problem of a jump of phase 2π, i.e., flyback. However, the fiber optic gyro according to the present invention uses a delta serrodyne waveform signal, i.e., triangular waveform signal in the phase modulation so that this fiber optic gyro never has the problem of flyback.

The conventional fiber optic gyro of closed-loop system with serrodyne modulation has a defect that an error caused by the flyback, e.g., 2π error occurs. However, the fiber optic gyro according to the present invention uses the delta serrodyne waveform signal, i.e., triangular waveform signal in the phase modulation. There is then the advantage that there is no error caused by the flyback.

The conventional fiber optic gyro of closed-loop system with serrodyne modulation has a defect that a random walk is deteriorated due to the flyback. However, the fiber optic gyro according to the present invention uses the delta serrodyne waveform signal, i.e., triangular waveform signal in the phase modulation. There is then the advantage that the random walk can be prevented from being deteriorated due to the flyback.

In the fiber optic gyro of closed-loop system with serrodyne modulation, when the input rotation rate is close to zero, the serrodyne waveform, i.e., inclination of the sawtooth wave becomes small and the serrodyne period is extended so that the operation of the second integrator becomes inaccurate. In the fiber optic gyro according to the present invention, the period $T=T_A+T_B$ of the delta serrodyne wave is constant so that the above-mentioned defects can be removed.

Since the conventional fiber optic gyro of closed-loop system with serrodyne modulation uses the two oscillation frequencies, i.e., the phase modulation frequency and the serrodyne modulation frequency, there is then the defect that a lock-in phenomenon occurs. However, in the fiber optic gyro according to the present invention, since the single frequency with delta serrodyne wave signal is used in order to phase-modulate the propagation beam and to detect the Sagnac phase difference Δθ, there is then the advantage that the lock-in phenomenon can be prevented.

The conventional fiber optic gyro of the digital modulation method generates the phase difference Δβ whose one period is 2τ (τ is a time required by beam to propagate in the optical fiber loop 3) and needs modulation frequencies in the order of MHz. However, in the fiber optic gyro according to the present invention, the period T of the delta serrodyne wave signal can be made several 10s to several 100s of times the τ. Therefore, the fiber optic gyro according to the present invention can use the modulation frequency of low frequency region in the order of several kHz to several 10s of kHz, and hence the fiber optic gyro according to the present invention can be made inexpensive.

In the fiber optic gyro according to the present invention, when the Sagnac phase difference Δθ is obtained from the delta serrodyne wave signal, there is used a pulse signal of a period $τ_C$ which is a reciprocal of several 10s to several 100s of the period T of the delta serrodyne wave signal. Hence, there are obtained pulses of the number several 10s of to several 100s of the times of the pulses per unit time compared with the conventional fiber optic gyro of the closed-loop system with serrodyne modulation. As a result, there can be obtained a rotation rate Ω with high accuracy and high resolution.

The conventional fiber optic gyro of digital modulation method generates the reference phase difference Δβ=±π/2 based on the interference light intensity signal I. Therefore, if the reference phase difference $\Delta\beta$ is not accurately equal to $\pm\pi/2$, then there occurs an error. Accordingly, such reference phase difference $\Delta\beta=\pi/2$ has to be controlled and managed with expensive costs. However, in the fiber optic gyro according to the present invention, the reference phase difference $\Delta\beta$ need not be set to $\Delta\beta=\pm(2n-1)\pi a/2$, and hence the reference phase difference $\Delta\beta$ can be selected from values in a wide range near $\Delta\beta=\pm(2n-1)\pi/2$.

According to the present invention it is possible to remove the defects or problems encountered with the conventional fiber optic gyros of phase-modulation method, closed-loop system with serrodyne modulation and digital modulation and to provide a fiber optic gyro with high accuracy.

Figure 20:
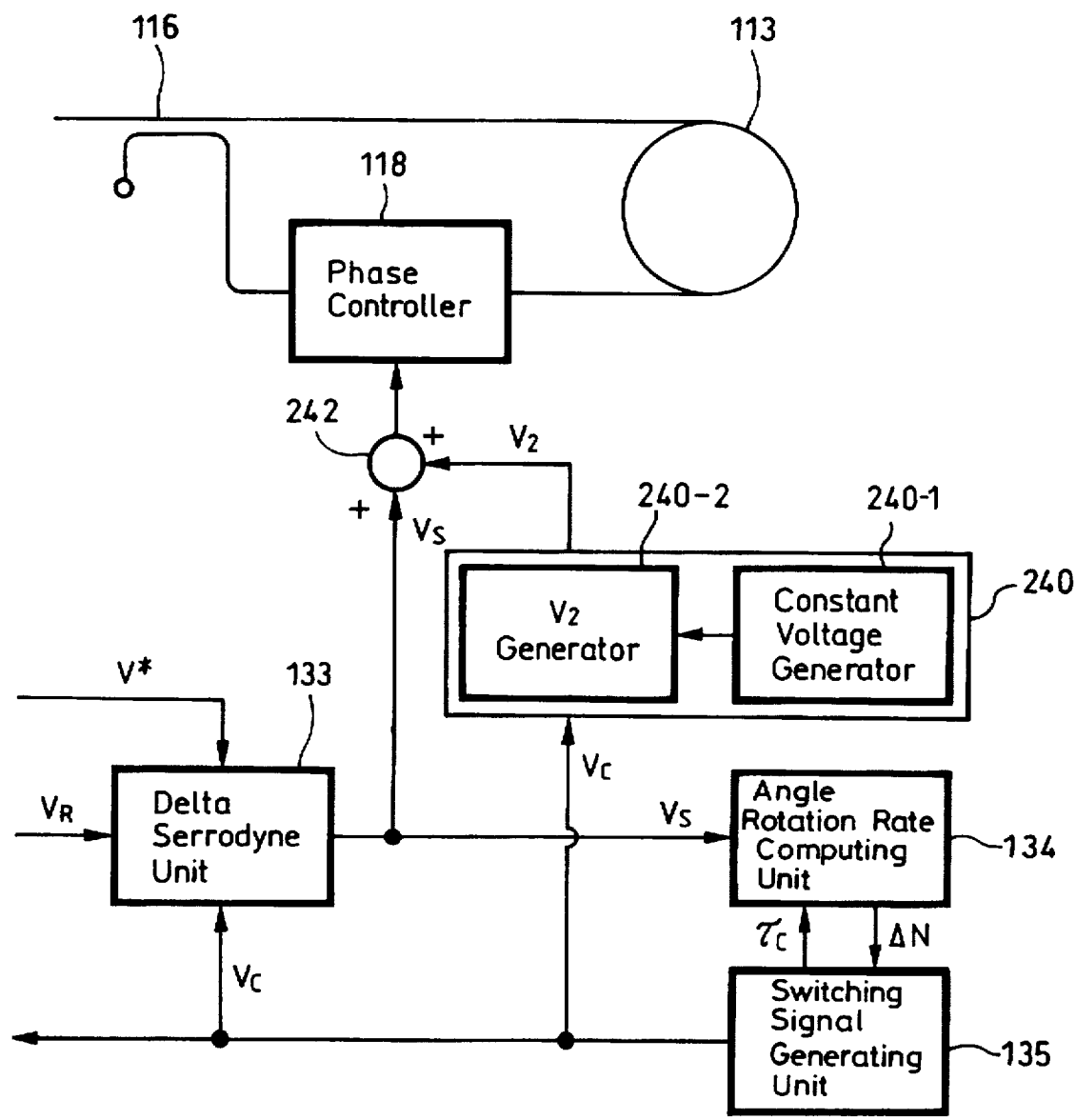
FIG. 20 is a block diagram showing a fiber optic gyro according to a second embodiment of the present invention.

A second embodiment of the present invention will be described below. FIG. 20 shows a part of the fiber optic gyro according to the second embodiment. As compared with the fiber optic gyro of delta serrodyne method according to the first embodiment described with reference to FIG. 7, the fiber optic gyro according to the second embodiment differs from the fiber optic gyro according to the first embodiment in a $V_2$ generating unit 240 and an adder 242. Other elements and parts may be similar to those of the first embodiment shown in FIG. 7.

In FIG. 20, elements and parts other than the $V_2$ generating unit 240 and the adder 242 are marked with the same references as those of FIG. 7 and therefore need not be described in detail.

The $V_2$ generating unit 240 receives the switching signal $V_C$ from the switching signal generating unit 135 and generates a square wave signal $V_2$. The adder 242 adds the delta serrodyne waveform signal $V_S$ outputted from the delta serrodyne unit 133 and the square wave signal $V_2$ outputted from the $V_2$ generating unit 240. An output signal $V_S+V_2$ from the adder 242 is supplied to the controller 118.

Specifically, according to this embodiment, the delta serrodyne waveform signal $V_S$ is corrected by the square wave signal $V_2$. The output signal $V_C+V_2$ from the adder 242 is referred to as "correction delta serrodyne waveform signal $V_S+V_2$". As described above, according to this embodiment, beam propagating along the optical fiber loop 113 is phase-modulated not by the delta serrodyne waveform signal $V_S$ but by the correction delta serrodyne waveform signal $V_S+V_2$.

The square wave signal $V_2$ will be described below.

The square wave signal $V_2$ functions to correct the phase control voltage signal supplied to the phase controller 118, i.e., the delta serrodyne waveform signal $V_S$, and has the same period as the period T of the phase control voltage signal to be corrected. The square wave signal $V_2$ has a constant magnitude H and the polarity thereof is inverted at times when the phase control voltage signal becomes maximum and minimum.

Figure 21A:
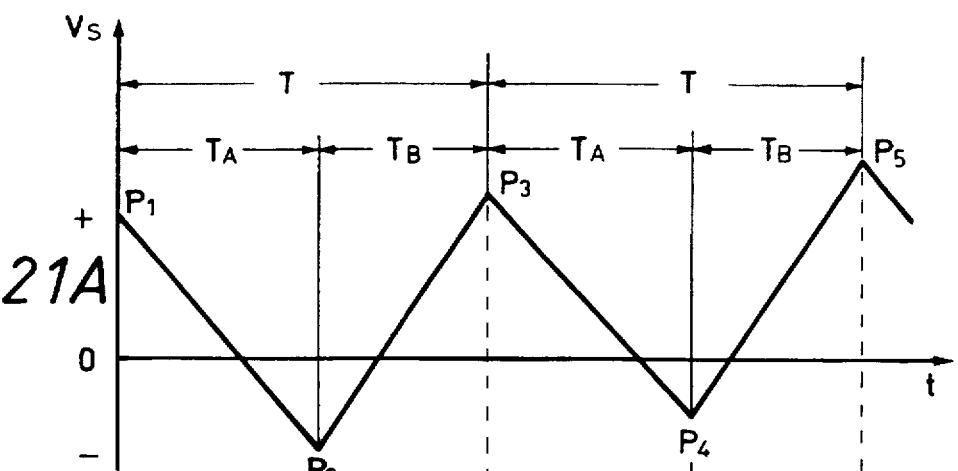
FIGS. 21A to 21C are diagrams used to explain an operation of the fiber optic gyro according to the second embodiment of the present invention.
Figure 21B:
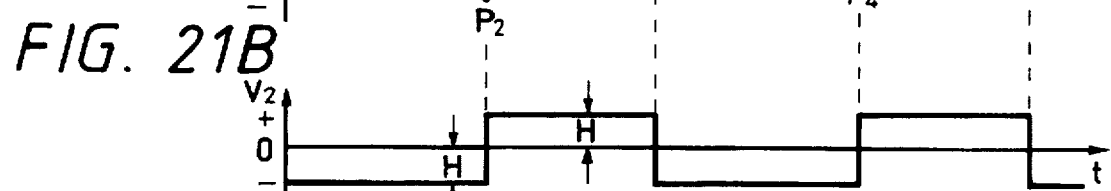
Figure 21C:
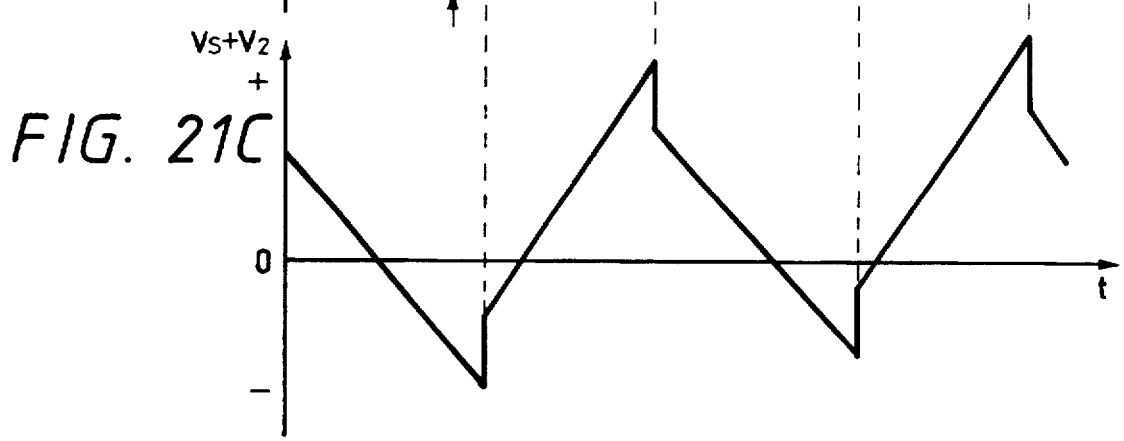

An operation of the adder 242 will be described with reference to FIGS. 21A to 21C. FIG. 21A shows the delta serrodyne waveform signal $V_S$ outputted from the delta serrodyne unit 133. FIG. 21B shows the square wave signal $V_2$ outputted from the $V_2$ generating circuit 240. FIG. 21C shows the correction delta serrodyne signal $V_S+V_2$ outputted from the adder 242.

As shown in FIG. 21B, the square wave signal $V_2$ according to this embodiment has the constant magnitude H, the period T equal to the period T of the delta serrodyne waveform signal $V_S$, and the polarity thereof is inverted at switching times $T_A$, $T_B$. As can be seen from the comparison between FIGS. 21A and 21C, the period T and the switching times $T_A$, $T_B$ of the correction delta serrodyne waveform signal $V_S+V_2$ and the delta serrodyne waveform signal $V_S$ are equal to each other. Also, the inclinations of the signals of the times $T_A$, $T_B$ within one period T are equal to each other.

Referring back to FIG. 20, the $V_2$ generating unit 240 includes a constant voltage generator 240-1 and a $V_2$ generator 240-2. The constant voltage generator 240-1 may include a Zener diode or the like for generating a constant DC voltage. The $V_2$ generator 240-2 may include a potentiometer for changing the DC voltage supplied from the constant voltage generator 240-1 to a necessary DC voltage H and a change-over switch for receiving the switching signal $V_C$ to thereby change the polarities alternately at every time $T_A$, $T_B$. The switching signal $V_C$ is the signal with the period $T=T_A+T_B$ in which the sign is alternately changed at every time $T_A$, $T_B$.

The potentiometer may be formed of a resistance material having the same temperature characteristic, whereby a voltage dividing ratio can be prevented from being affected by a temperature.

An operation of the signal processing unit 131, the delta serrodyne unit 133, the angle/rate computing unit 134 and the switching signal generating unit 135 will be described. With reference to FIGS. 9A through 9E and FIG. 10, operation of the signal processing unit 131 in the fiber optic gyro according to this embodiment, in particular, the demodulator will be described. As shown in the equation (26), the delta serrodyne phase differences $\alpha_{SA}$, $\alpha_{SB}$ generated in the interference light intensity signal I are proportional to the phase control voltage signal supplied to the phase controller 118, i.e., the inclination angle of the correction delta serrodyne waveform signal $V_S+V_2$.

Since the inclination angle of the correction delta serrodyne waveform signal $V_S+V_2$ is equal to the inclination angle of the delta serrodyne waveform signal $V_S$, there are obtained the phase difference signals $\alpha_{SA}$, $\alpha_{SB}$ similar to those obtained when the propagation beam is modulated by the delta serrodyne wave signal $V_S$. Accordingly, the phase difference $\Delta I$ of the same magnitude as that of the conventional fiber optic gyro is obtained and there can be obtained the same signals as the signals I and $\Delta I/2$ shown in FIGS. 9A and 9B.

However, in the output signal $V_I'$ (see FIG. 9C) from the DC cancelcircuit 131-1, the pulse-like protrusions generated at the switching time point between the times $T_A$ and $T_B$ are different from those of the first embodiment of the present invention.

However, the pulse-like protrusions are eliminated when the signal $V_I'$ is passed through the AC amplifier 131-2. The output signal $V_I'$ from the AC amplifier 131-2 is further demodulated based on the switching signal $V_C$ by the demodulator 131-3. Consequently, the signal $V_I''=V_O$ outputted from the signal processing unit 131 is the same as the delta serrodyne waveform signal $V_S$ of the first embodiment of the present invention as shown in FIG. 9E.

If the output signal $V_I'$ from the DC cancel circuit 131-1 shown in FIG. 9C is amplified by the AC amplifier 131-2, then the spike-like protrusions of the signal $V_I$ are eliminated by the filter function of the AC amplifier 131-2 and the time is delayed by $T_F$.

However, according to the second embodiment of the present invention, such time delay may be eliminated. For example, the signal processing unit 131 or the switching signal generating unit 135 may digitally generate a constant time delay corresponding to the time delay $T_F$ in the switching signal $V_C$, and such constant time delay is used to demodulate the signal. If the demodulator has an analog filter function like the demodulator 131-3, such demodulator is affected by environmental conditions such as a temperature or the like.

With reference to FIG. 11 and FIGS. 12A through 12C, an operation of the delta serrodyne unit 133 will be described. Since the signal $V_I''=V_O$ outputted from the signal processing unit 131 is similar to that of the first embodiment of the present invention, and hence the operation of the integrator 132 and the delta serrodyne unit 133 is similar. The delta serrodyne unit 133 generates the delta serrodyne waveform signal $V_S$ shown in FIG. 12C.

An operation of the angle/rate computing unit 134 will be described with reference to FIGS. 22A through 22D. FIG. 22A shows a delta serrodyne waveform signal $V_S$, and FIG. 22B shows a sign judgement signal $T_{SG}$. FIG. 22C shows the correction delta serrodyne waveform signal $V_S+V_2$, and FIG. 22D shows a sign judgement signal $T_{SG}$ corresponding to the correction delta serrodyne waveform signal $V_S+V_2$. The sign judgement signal $T_{SG}$ is a square wave signal in which the time $T_+$ in which the correction delta serrodyne waveform signal is positive is set to +1 and the time $T_-$ in which the correction delta serrodyne waveform signal is negative is set to −1.

If the sign judgement signal $T_{SG}$ shown in FIG. 22B is compared with the sign judgment signal $T_{SG}$ shown in FIG. 22D, it is to be noted that, although the phase of the sign judgement signal shown in FIG. 22B is advanced from that of the sign judgement signal $T_{SG}$ shown in FIG. 22D by ε, others are the same. Specifically, both of them have the phase difference ε therebetween and the waveforms thereof are the same. This is clear from comparison between the delta serrodyne waveform signal shown in FIG. 22A and the correction delta serrodyne waveform signal shown in FIG. 22C.

Accordingly, a difference $\Delta T=T_+-T_-$ between the time $T_+$ in which the sign judgement signal $T_{SG}$ relative to the correction delta serrodyne waveform $V_S+V_2$ is positive and the time $T_-$ in which the sign judgement signal $T_{SG}$ is negative is equal to a difference $\Delta T=T_+-T_-$ between the time $T_+$ in which the sign judgement signal $T_{SG}$ relative to the delta serrodyne waveform signal $V_S$ is positive and the time $T_-$ in which the sign judgement signal $T_{SG}$ relative to the delta serrodyne waveform signal $V_S$ is negative.

This is also true in the operation of the switching signal generating unit 135. The switching signal generating unit 135 generates the switching signal $V_C$ with the period T and whose sign is inverted at every times $T_A$, $T_B$ similarly to the fiber optic gyro according to the first embodiment.

This switching signal $V_C$ is supplied not only to the $V_2$ generating unit 240 but also to the signal processing unit 131 and the delta serrodyne unit 133.

According to this embodiment, beam propagating along the optical fiber loop 113 is phase-modulated not by the delta serrodyne waveform signal $V_S$ but by the correction delta serrodyne waveform signal $V_S+V_2$. As a result, similar operation and result obtained when beam is phase-modulated by the delta serrodyne waveform signal $V_S$ can be obtained.

However, there is one difference which is a phase of amplitude modulation. If beam propagating along the optical fiber loop 113 is phase-modulated by the phase control unit 118, then an amplitude modulation is accompanyingly generated, and the thus generated amplitude modulation causes a bias. According to this embodiment, this amplitude modulation is advanced in phase by ε. Specifically, if beam is phase-modulated by the correction delta serrodyne waveform signal $V_S+V_2$, then the phase of amplitude modulation thus generated is advanced by ε compared with the case that beam is phase-modulated by use of the delta serrodyne waveform signal $V_S$.

This phase difference ε is a phase difference between the sign judgement signal $T_{SG}$ shown in FIG. 22B and the sign judgement signal $T_{VS/SG}$ shown in FIG. 22D. This phase difference ε is generated due to the difference between the delta serrodyne waveform $V_S$ shown in FIG. 21A and the correction delta serrodyne waveform signal $V_S+V_2$ shown in FIG. 21C. Accordingly, the phase difference ε is proportional to the magnitude H of the square wave signal $V_2$.

The phase difference ε increases as the magnitude H of the square wave signal $V_2$ increases, and the phase difference ε decreases as the square wave signal $V_2$ decreases. If the polarity of the square wave signal $V_2$ is inverted, then the sign of the phase difference ε is inverted. By way of example, if the square wave signal $V_2$ is negative during the time $T_A$ and positive during the time $T_B$, then the sign judgement signal $T_{SG}$ according to this embodiment shown in FIG. 22D is advanced in phase from the sign judgement signal $T_{SG}$ shown in FIG. 22B. Conversely, if the square wave signal $V_2$ is positive during the time $T_A$ and negative during the time $T_B$, then the sign judgement signal $T_{SG}$ according to this embodiment shown in FIG. 22D is delayed from the sign judgement signal $T_{SG}$ shown in FIG. 22B.

The magnitude H and the polarity of the square wave signal $V_2$ can be freely set by the $V_2$ generating unit 240. Specifically, the phase difference ε of the amplitude modulation which causes a bias can be adjusted by changing the magnitude H and the polarity of the square wave signal $V_2$ which is the output from the $V_2$ generating unit 240. As described above, according to this embodiment, the phase δ of the amplitude modulation can be freely changed from the positive value to zero and further to the negative value by changing the magnitude H and the polarity of the square wave signal $V_2$ which is the output of the $V_2$ generating unit 240, whereby the bias can be canceled out or minimized.

Figure 1:
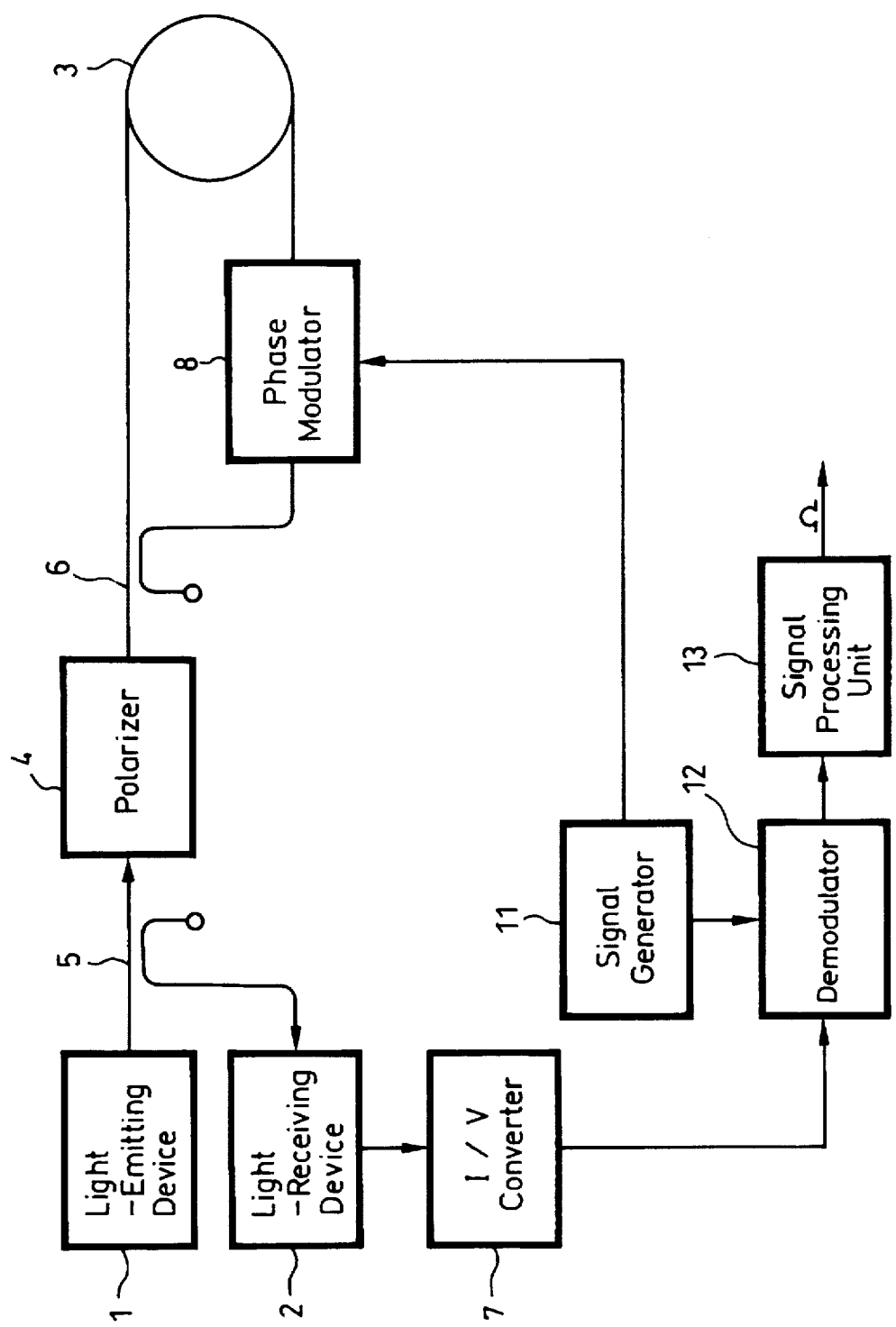
FIG. 1 is a block diagram showing an example of a conventional fiber optic gyro (open-loop system)
Figure 2:
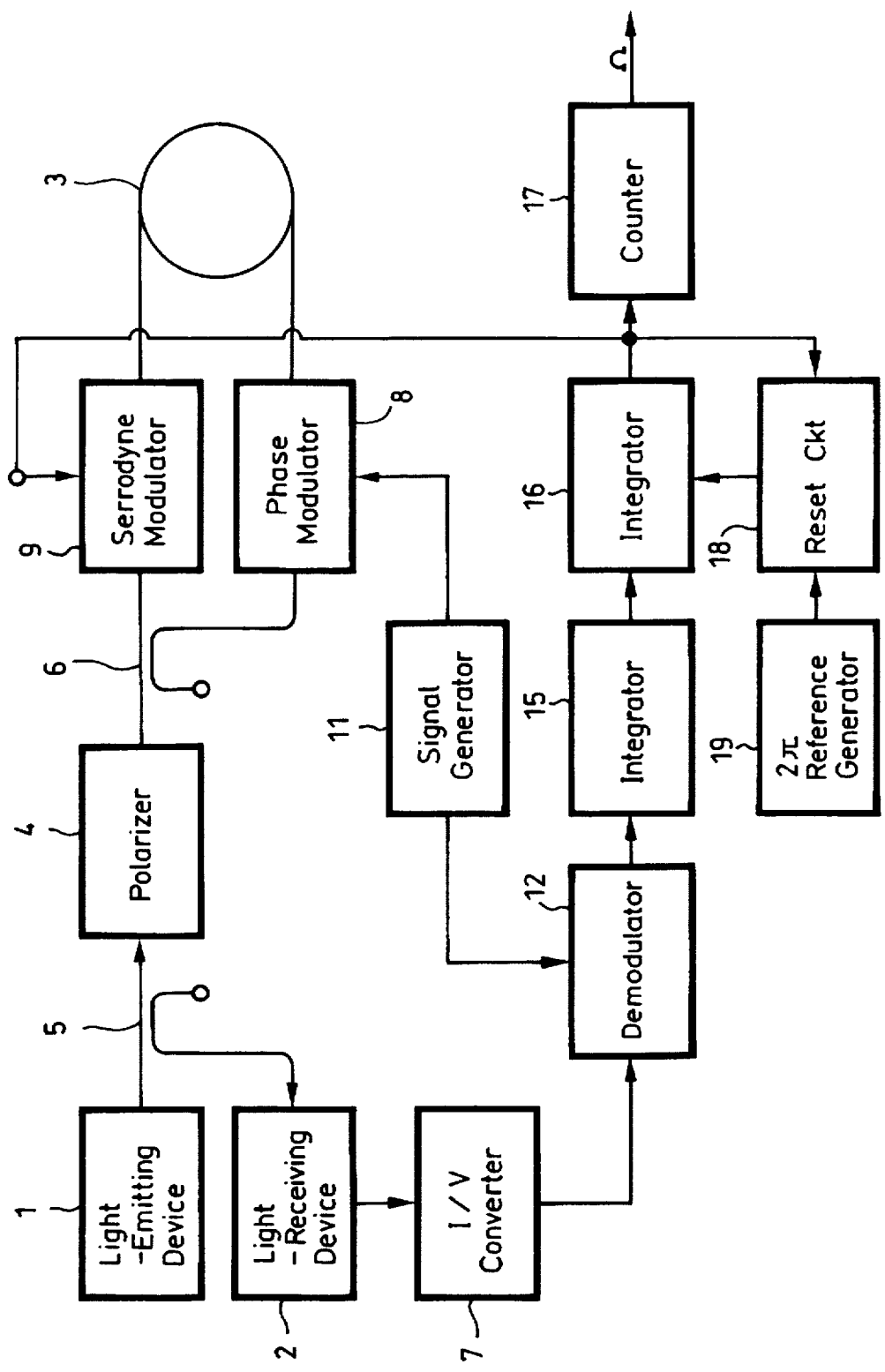
FIG. 2 is a block diagram showing an example of a conventional fiber optic gyro (closed-loop system with serrodyne modulation)
Figure 4:
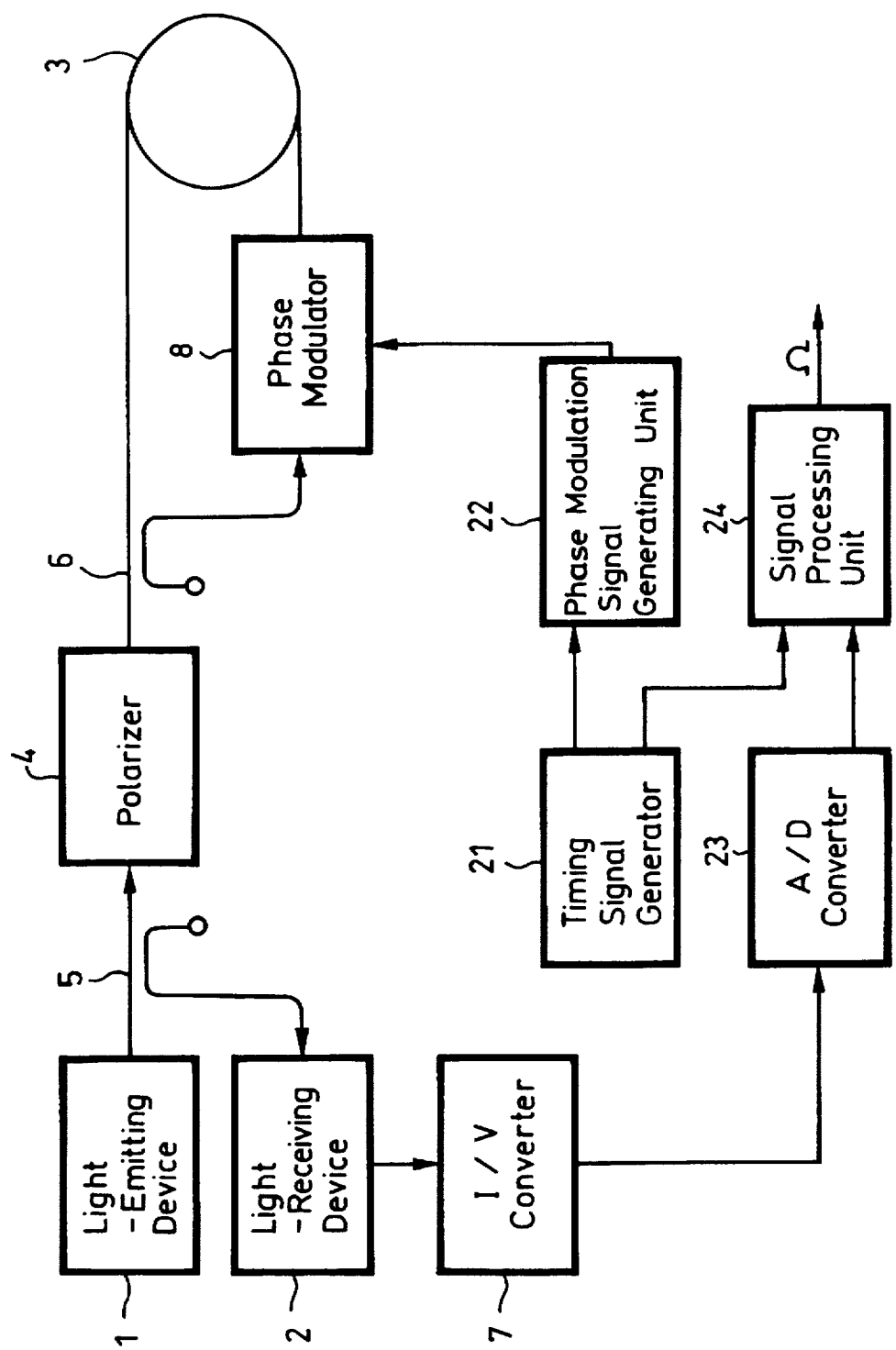
FIG. 4 is a block diagram showing an example of a conventional fiber optic gyro (control system with digital modulation)
Figure 5A:
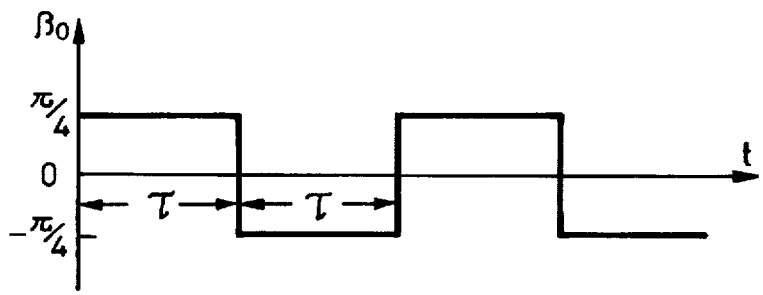
FIGS. 5A through 5D are waveform diagrams used to explain an operation of the conventional fiber optic gyro (control system with digital modulation)
Figure 5B:
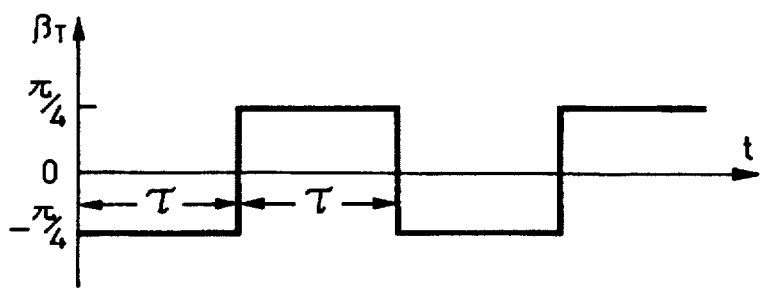
Figure 5C:
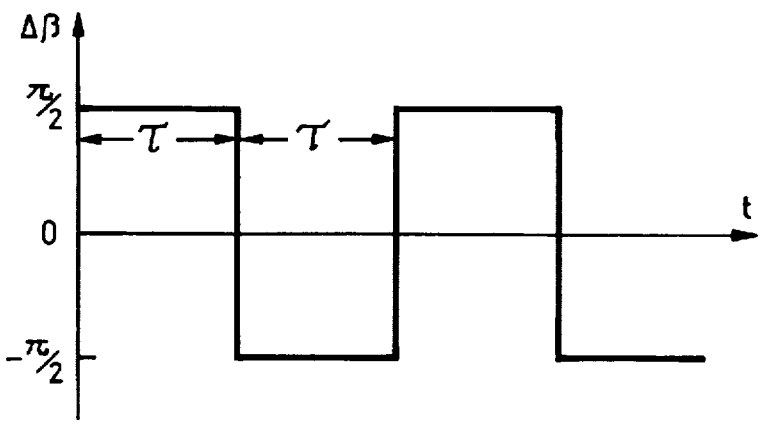
Figure 5D:
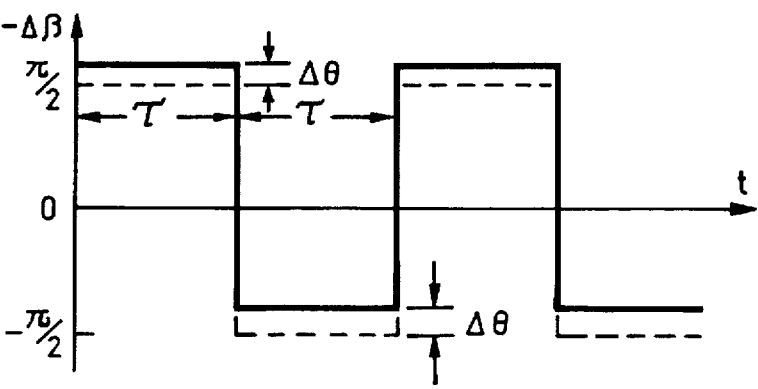
Figure 23:
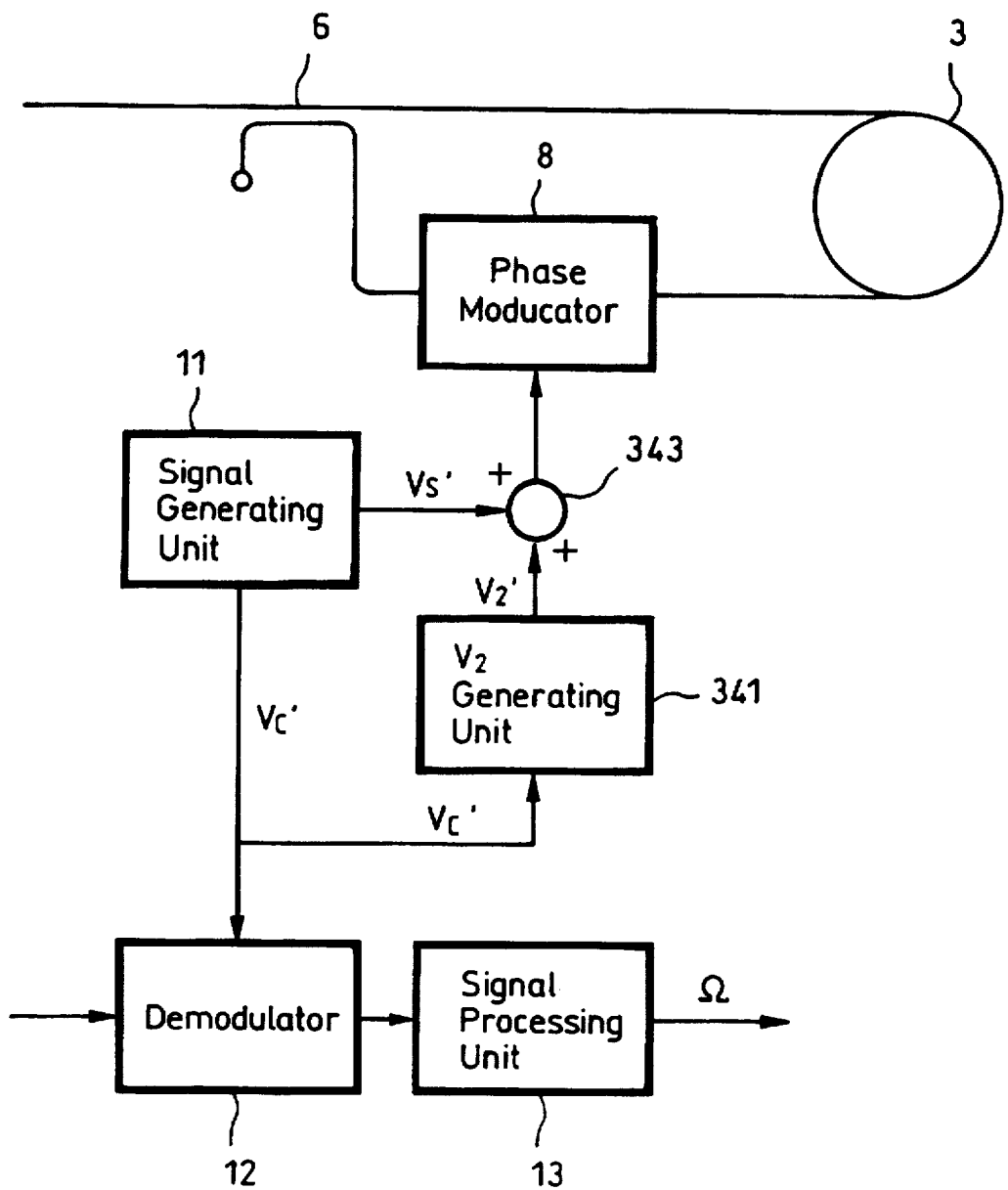
FIG. 23 is a block diagram showing a fiber optic gyro according to a third embodiment of the present invention.

A fiber optic gyro according to a third embodiment of the present invention will be described with reference to FIG. 23 and FIGS. 24A through 24D. FIG. 23 is a fragmentary block diagram showing a part of the fiber optic gyro according to this embodiment. The fiber optic gyro according to this embodiment is a modification of the fiber optic gyro of phase-modulation system which has been described so far with reference to FIG. 1. The fiber optic gyro according to this embodiment differs from the fiber optic gyro shown in FIG. 1 in a $V_2$ generating unit 341 and an adder 343, and other elements and parts of the fiber optic gyro according to this embodiment may be similar to those of the fiber optic gyro shown in FIG. 1.

Accordingly, in FIG. 23, like elements and parts other than the $V_2$ generating unit 341 and the adder 343 are marked with the same references and therefore need not be described in detail.

According to this embodiment, the $V_2$ generating unit 341 receives a demodulating signal $V_C'$ supplied from the signal generator 11 to the demodulator 12 and generates a square wave signal $V_2'$. The adder 343 adds the square wave signal with the angular frequency $\omega_m$ outputted from the signal generator 11 and the square wave signal $V_2'$ outputted from the $V_2$ generating unit 341 and supplies an added result (voltage signal $V_S'+V_2'$) to the phase modulator 8.

The voltage signal $V_S'+V_2'$ is referred to as "correction sine wave signal. As described above, according to this embodiment, beam propagating along the optical fiber loop 113 is phase-modulated not by the sine wave signal $V_S'$ with the angular frequency a $\omega_m$ but by the correction sine wave signal $V_S'+V_S'$.

With reference to FIGS. 24A through 24D, an operation of the fiber optic gyro according to this embodiment will be described below. FIG. 24A shows the sine wave signal $V_S'$ with the angular frequency $\omega_m$ outputted from the signal generator 11. FIG. 24B shows the square wave signal $V_2'$ outputted from the $V_2$ generating unit 341, and FIG. 24C shows the correction sine wave signal $V_S'+V_2'$ for controlling a phase.

The square wave signal $V_2'$ according to this embodiment will be described. Comparing FIG. 24A with FIG. 24B, it is to be noted that the square wave signal $V_2'$ is inverted in polarity at points in which the sine wave signal $V_S'$ with the angular frequency $\omega_m$ is maximized and minimized. Accordingly, the square wave signal $V_2'$ is biased in phase from the sine wave signal $V_S'$ by 90°.

Similarly to the second embodiment, the phase difference $\epsilon$ of amplitude modulation can be changed by changing the magnitude H and the polarity of the square wave signal $V_2'$. As described above, according to this embodiment, a bias can be canceled out or minimized.

Let us now consider the result that beam propagating along the optical fiber loop 3 is phase-modulated by use of the correction sine wave signal $V_S'+V_2'$. Even when the correction sine wave signal $V_S'+V_2'$ is used, the phase difference $\Delta\beta$ generated in the interference light intensity signal I is similar to that of the conventional invention. Accordingly, the interference light intensity I is expressed by the equations (7) to (9).

However, in actual practice, the interference light intensity signal I expressed by the equation (8) contains a pulse generated when the polarity of the square wave signal $V_2'$ is inverted as shown in FIG. 24D. This pulse has a period $T_m/2$ half a modulation frequency period $T_m$ and a pulse width is $\tau$ (time for beam to propagate along the optical fiber loop 3). For example, assuming that $T_m$ is a period of a sine wave signal $V_S'$ shown in FIG. 24A and that $\omega_m$ is an angular frequency, then the period of the pulse shown in FIG. 24D becomes $T_m/2$ and the angular frequency becomes $2\omega_m$.

Since the pulse width $\tau$ is sufficiently small as compared with the period $T_m$ of the modulation frequency, the influence of such pulse can be neglected. Accordingly, the equations (1) to (9) can be established.

In the conventional fiber optic gyro, as a method of minimizing a bias caused by an amplitude modulation, there is known a method using an ideal frequency $f=1/(2\tau)$ as a phase-modulation frequency. According to this method, the phase-modulation frequency ranges from several 100s of kHz to several MHz so that an induction is frequently generated and that the fiber optic gyro becomes expensive. In the fiber optic gyro according to this embodiment of the present invention, the bias caused by the amplitude modulation can be minimized and the sufficiently small frequency as compared with the ideal frequency $f=1/(2\tau)$ can be used as the phase-modulation frequency. Therefore, the fiber optic gyro according to the present invention can be miniaturized and made inexpensive.

In the conventional fiber optic gyro, as a method of minimizing a bias caused by an amplitude modulation when a frequency sufficiently small as compared with an ideal frequency $f=1/(2\tau)$ is used as a phase-modulation frequency, there is known a method of electrically eliminating a bias generated optically. According to this method, since a bias generated by a different cause is canceled out by a different means, if the environmental condition such as a temperature is changed, there is then the defect that a new bias appears. According to the present invention, a bias optically generated is canceled out by an optical means and a bias electrically generated is canceled out by an electrical means. Therefore, even when the environmental condition is changed, there is then the advantage that a new bias can be prevented from being generated.

Although a bias caused by an amplitude modulation is generated accompanying with the phase modulation, according to the present invention, a bias is eliminated by use of the phase controller used in the phase modulation. Therefore, even when the phase controller is affected by the change of the environmental condition such as a temperature, the cancellation of bias can be prevented from being affected by the change of environmental condition.

In the conventional fiber optic gyro, as a method of controlling a reference phase of a demodulator such that a bias is minimized, there is known a method of minimizing a bias caused by amplitude modulation when a frequency sufficiently smaller than an ideal frequency $f=1/(2\tau)$ is used as a phase-modulation frequency. To this end, an analog phase-shifter is used and the analog phase-shifter tends to be affected by the change of the environmental condition such as a temperature. However, according to the present invention, a square wave signal for minimizing a bias is controlled digitally, e.g., by use of a clock signal. There is then the advantage that such control can be prevented from being affected by the change of the environmental condition such as a temperature.

The present invention can be applied to the fiber optic gyro of the phase-modulation method, the closed-loop system with serrodyne modulation and the digital modulation, in particular, the present invention can be suitably applied to the fiber optic gyro of delta serrodyne system. Accordingly, a frequency ranging from several kHz to several 10s of kHz can be used as a phase-modulation frequency. Therefore, it is possible to provide a fiber optic gyro which is inexpensive and highly reliable.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A fiber optic gyro comprising a light source; an optical fiber loop; means for producing a control voltage input signal having a triangular wave form including an up slope linear portion corresponding to a first time $T_A$ and a down slope linear portion corresponding to a second time $T_B$, said input signal having a constant period T where $T=T_A+T_B$; a first propagating beam and a second propagating beam propagating along said optical fiber loop in opposite directions; a phase controller for receiving said control voltage input signal and adjusting a phase differential between said first and second propagating beams according to said control voltage input signal; a light receiving device for detecting an interference between said first and second propagating beam, converting said interference into a interference light intensity signal I and outputting said signal; said phase controller generating a reference phase difference $\Delta\beta$ and a ramp phase difference $\Delta\sigma$ in said interference light intensity signal I, said reference phase difference $\Delta\beta$ having a first reference phase difference portion $\Delta\beta_A$ corresponding to first time $T_A$ and a second reference phase difference portion $\Delta\beta_B$ corresponding to second time $T_B$, said first and second reference phase difference portions having opposite polarities and equal absolute values, means for receiving said light intensity signal I and detecting from said signal a difference between a Sagnac phase difference $\Delta\Theta$ and said ramp phase difference $\Delta\sigma$; said ramp phase difference $\Delta\sigma$ having a first inclination corresponding to a phase difference $\Delta\beta_A+\sigma$ during said first time $T_A$ and a second inclination corresponding to a phase difference $\Delta\beta_B$ during said second time $T_B$, one of said first and second inclinations having a positive value and the other having a negative value, thereby producing a delta serrodyne wave signal having a waveform that inclines at every time $T_A$ and $T_B$; means for controlling said times $T_A$ and $T_B$ so as to thereby retain a mean value of said triangular wave within a predetermined amplitude, whereby a rotation rate $\Omega$ is obtained from the Sagnac phase difference $\Delta\Theta$ generated in said interference light intensity signal I when said optical fiber is rotated around a central axis of said loop at said rotation rate $\Omega$.

2. A fiber optic gyro as claimed in claim 1, wherein said reference phase difference $\Delta\beta$ becomes $\Delta\beta_A=-(2n-1)\pi/2$ during said first time $T_A$ and $\Delta\beta_B=+(2n-1)\pi/2$ during said second time $T_B$ where n is a positive integer.

3. A fiber optic gyro as claimed in claim 1, wherein said reference phase difference $\Delta\beta$ becomes $\Delta\beta_A=-|(2n-2)\pi/2+\delta|$ during said first time $T_A$ and $\Delta\beta_B=+|(2n-1)\pi/2+\delta|$ where n is a positive integer and $\delta$ is an arbitrary constant which satisfies $|\delta|<\pi/2$.

4. A fiber optic gyro as claimed in claim 1, wherein when a positive time in one period of said delta serrodyne waveform signal is $T_+$ and a negative time is $T_-$, durations of said first time $T_A$ and said second time $T_B$ are adjusted based on a difference $\Sigma T_+ - \Sigma T_-$ or a difference $\Sigma(T_+-T_-)$.

5. A fiber optic gyro as claimed in claim 4, wherein an input rotation rate $\Omega$ or a rotation angle is computed based on a difference $\Sigma T_+ - \Sigma T_-$ or a difference $\Sigma(T_+-T_-)$ when a positive time in one period T of said delta serrodyne waveform signal is $T_+$ and a negative time is $T_-$.

6. A fiber optic gyro as claimed in claim 5, wherein when said positive time $T_+$ and said negative time $T_-$ are counted by a pulse of a predetermined period and pulse numbers are respectively set to $N_+$ and $N_-$ an input rotation rate and a rotation angle are computed based on a difference $\Sigma N_+ - \Sigma N_-$ or difference $\Sigma(N_+-N_-)$.

7. A fiber optic gyro as claimed in claim 1, wherein the slope of said control voltage supplied to said phase controller corresponds to a sum of a constant reference voltage signal V* corresponding to said reference phase difference and a ramp voltage signal $V_R$ corresponding to said ramp phase difference $\sigma$ and said ramp voltage signal $V_R$ is generated by integrating a voltage signal corresponding to a difference signal $\Delta I$ between a value $I_A$ of said interference light intensity in said first time $T_A$ and a value $I_B$ of said interference light intensity I in said second time $T_B$.

8. A fiber optic gyro according to claim 1, further comprising:

a signal processing unit for receiving said interference light intensity signal I outputted from said light-receiving device and generating a voltage signal $V_O$ corresponding to a difference signal $\Delta I = I_A - I_B$.

an integrator for receiving and integrating said voltage signal $V_O$; and a delta serrodyne unit for receiving an output signal $V_R$ of said integrator and generating said delta serrodyne waveform signal.

9. A fiber optic gyro as claimed in claim 8, wherein said signal processing unit includes a DC cancel circuit for canceling a DC component from said interference light intensity signal I to generate an alternating signal which alternately changes to $\pm\Delta I/2$ at every times $T_A$ and $T_B$, an AC amplifier for AC-amplifying an output signal from said DC cancel circuit and a demodulator for obtaining said DC voltage signal $V_O$ from an output signal of said AC amplifier.

10. A fiber optic gyro as claimed in claim 8 or 9, wherein said delta serrodyne unit includes an adder for adding a reference voltage signal V* whose sign alternately changes to positive or negative at every times $T_A$, $T_B$ and said ramp voltage signal $V_R$ outputted from said integrator and a delta serrodyne integrator for integrating an output signal from said adder.

11. A fiber optic gyro as claimed in any one of claims 7, 8, or 9, further comprising a reference phase control unit for generating said reference voltage signal V* by use of a voltage signal corresponding to a mean value $I_0$ between said interference light intensity signal $I_A$ in said first time $T_A$ and said interference light intensity signal $I_B$ in said second time $T_B$.

12. A fiber optic gyro comprising a light source, an optical fiber loop, a phase controller for changing a phase differential between said first propagating beam and second propagating beam propagating along said optical fiber loop in opposite directions and a light receiving device for detecting interference light of said first propagating beam and said second propagating beam in which a rotation rate $\Omega$ is obtained from the Sagnac phase difference $\Delta\Theta$ generated in an interference light intensity signal I when said optical fiber loop is rotated around a central axis of said loop at said rotation rate $\Omega$, wherein said phase controller is supplied with a phase control voltage signal $V_S$ of period T where $T=T_a+T_b$, for controlling a phase between said first propagating beam and said second propagating beam and a square wave signal $V_2$ of period T in the added form; said square wave signal $V_2$ has a constant magnitude H and is inverted in polarity at time points in which said phase control voltage signal $V_S$ is maximized and minimized; said magnitude H and said polarity of said square wave signal $V_2$ are selected in such a manner that an optical bias is minimized; and means for controlling said times $T_a$ and $T_b$ to thereby retain a mean value of said control voltage signal $V_S$ within a predetermined amplitude.

13. A fiber optic gyro as claimed in claim 12, wherein said magnitude and said polarity of said square wave signal are selected such that a bias caused by an amplitude modulation generated in accompaniment with a phase modulation is minimized.

14. A fiber optic gyro as claimed in claim 12 or 13, wherein said interference light intensity signal I outputted from said light receiving device is demodulated by a demodulation signal having the same frequency as that of said phase control voltage signal $V_S$ and an operation for switching polarities of said demodulation signal is synchronized with points at which said phase control voltage signal $V_S$ is maximized or minimized with a constant phase difference.

15. A fiber optic gyro as claimed in claim 12 or 13, wherein said phase controller generates a reference phase difference $\Delta\beta$ and a ramp phase difference $\sigma$ in said interference light intensity signal I, said reference phase difference $\Delta\beta$ has a constant period T, said reference phase difference $\Delta\beta$ becomes first and second phase differences $\Delta\beta_A$, $\Delta\beta_B$ during first and second times $T_A$, $T_B$ of one period T, said first and second reference phase differences $\Delta\beta_A$, $\Delta\beta_B$ are opposite in sign but equal to each other in absolute value, said ramp phase difference $\sigma$ is controlled so as to cancel said Sagnac phase difference $\Delta\theta$ and fed back in phase to said propagating beam, said phase control voltage $V_S$ supplied to said phase controller has a first inclination corresponding to a phase difference $\Delta\beta_A+\sigma$ during said first time $T_A$ and a second inclination corresponding to a phase difference $\Delta\beta_B+\sigma$ during said second time $T_B$ and one of said first and second times $T_A$, $T_B$ becomes negative and the other becomes positive, thereby presenting a delta serrodyne waveform signal of triangular wave which inclines at every first and second times $T_A$, $T_B$.

16. A fiber optic gyro as claimed in claim 15, wherein said reference phase difference $\Delta\beta$ becomes $\Delta\beta=-(2n-1)\pi/2$ during said first time $T_A$ and $\Delta\beta_B=+(2n-1)\pi/2$ during said second time $T_B$ where n is a positive integer.

17. A fiber optic gyro as claimed in claim 15, wherein a sum of said first time $T_A$ and said second time $T_B$ composing one period of said delta serrodyne waveform signal is constant $T=T_A+T_B$ and durations of said first time $T_A$ and said second time $T_B$ are adjusted in such a manner that a peak value of said delta serrodyne waveform signal does not exceed a predetermined allowable value.

18. A fiber optic gyro according to claim 15, further comprising:

a signal processing unit for receiving said interference light intensity signal I outputted from said light-receiving device and generating a voltage signal $V_O$ corresponding to a difference signal $\Delta I=I_A-I_B$.

an integrator for receiving and integrating said voltage signal $V_O$; and a delta serrodyne unit for receiving an output signal $V_R$ of said integrator and generating said delta serrodyne waveform signal.

19. A fiber optic gyro as claimed in claim 18, wherein said signal processing unit includes a DC cancel circuit for canceling a DC component from said interference light intensity signal I to generate an alternating signal which alternately changes to $\pm\Delta I/2$ at every times $T_A$ and $T_B$, an AC amplifier for AC-amplifying an output signal from said DC cancel circuit and a demodulator for obtaining said DC voltage signal $V_O$ from an output signal of said AC amplifier.

* * * * *

UNITED STATES PATENT AND TRADEMARK OFFICE
CERTIFICATE OF CORRECTION

PATENT NO. : 5,781,296
DATED : July 14, 1998
INVENTOR(S) : Yamamoto, et al.

It is certified that error appears in the above-identified patent and that said Letters Patent is hereby corrected as shown below:

Claim 16, column 37, line 12: change "$\Delta\beta=-(2n-1)\pi/2$" to -- $\Delta\beta_A=-(2n-1)\pi/2$ --.

Signed and Sealed this

Twenty-ninth Day of December, 1998

Attest:

BRUCE LEHMAN

*Attesting Officer*   *Commissioner of Patents and Trademarks*